US011073599B2

(12) United States Patent
Rimini et al.

(10) Patent No.: US 11,073,599 B2
(45) Date of Patent: Jul. 27, 2021

(54) RADAR INTERFERENCE MITIGATION USING A PSEUDORANDOM OFFSET

(71) Applicant: Qualcomm Incorporated, San Diego, CA (US)

(72) Inventors: Roberto Rimini, San Diego, CA (US); Nan Zhang, San Diego, CA (US); Vijay Varadarajan, La Jolla, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 16/203,234

(22) Filed: Nov. 28, 2018

(65) Prior Publication Data

US 2019/0339358 A1 Nov. 7, 2019

Related U.S. Application Data

(60) Provisional application No. 62/668,061, filed on May 7, 2018.

(51) Int. Cl.
G01S 7/02 (2006.01)
G01S 13/08 (2006.01)
G01S 7/292 (2006.01)
G06F 7/58 (2006.01)
G01S 13/26 (2006.01)
G01S 13/32 (2006.01)

(52) U.S. Cl.
CPC ............ *G01S 7/023* (2013.01); *G01S 7/2928* (2013.01); *G01S 13/08* (2013.01); *G01S 13/26* (2013.01); *G01S 13/32* (2013.01); *G06F 7/582* (2013.01)

(58) Field of Classification Search
CPC ........ G01S 7/023; G01S 7/2928; G01S 13/26; G01S 13/28–13/288; G01S 13/32–13/346; G01S 13/86; G01S 13/88; H01Q 5/00
See application file for complete search history.

(56) References Cited

U.S. PATENT DOCUMENTS

| 4,359,736 | A | * | 11/1982 | Lewis | G01S 13/288 342/16 |
| 5,381,444 | A | * | 1/1995 | Tajima | G01S 13/762 342/118 |
| 5,646,626 | A | * | 7/1997 | Willis | G01S 7/354 342/145 |

(Continued)

*Primary Examiner* — Peter M Bythrow
(74) *Attorney, Agent, or Firm* — Qualcomm Incorporated

(57) ABSTRACT

An apparatus is disclosed for radar interference mitigation using a pseudorandom offset. The apparatus includes an antenna array and a wireless transceiver. The wireless transceiver is coupled to the antenna array and is configured to transmit, via the antenna array, a radar transmit signal based on at least one pseudorandom offset. The wireless transceiver is also configured to receive, via the antenna array, at least a portion of another radar transmit signal from another apparatus. The wireless transceiver is additionally configured to receive, via the antenna array, a radar receive signal that includes a portion of the radar transmit signal that is reflected by an object. At a given time, a frequency of the radar receive signal is different than a frequency of the radar transmit signal based on the at least one pseudorandom offset.

27 Claims, 13 Drawing Sheets

(56) References Cited

U.S. PATENT DOCUMENTS

| | | | | |
|---|---|---|---|---|
| 5,892,477 | A * | 4/1999 | Wehling | G01S 7/352 342/18 |
| 5,896,562 | A * | 4/1999 | Heinonen | H03D 7/165 455/552.1 |
| 6,704,549 | B1 * | 3/2004 | Sorrells | H03D 7/00 455/102 |
| 7,016,686 | B2 * | 3/2006 | Spaling | H04W 24/08 370/310 |
| 8,781,422 | B2 * | 7/2014 | Tanii | H04L 27/12 455/209 |
| 8,818,450 | B2 * | 8/2014 | Caballero | H04W 52/367 455/552.1 |
| 9,300,342 | B2 * | 3/2016 | Schlub | H04W 52/367 |
| 9,575,160 | B1 * | 2/2017 | Davis | G01S 7/352 |
| 9,772,397 | B1 * | 9/2017 | Bordes | G01S 13/931 |
| 9,793,616 | B2 * | 10/2017 | Ouyang | H01Q 21/28 |
| 10,312,593 | B2 * | 6/2019 | Yarga | H01Q 7/005 |
| 10,605,892 | B2 * | 3/2020 | Bilik | G01S 13/32 |
| 2003/0043934 | A1 * | 3/2003 | Roberts | H04B 17/309 375/316 |
| 2003/0151542 | A1 * | 8/2003 | Steinlechner | G01S 13/222 342/70 |
| 2003/0184469 | A1 * | 10/2003 | Brosche | G01S 13/325 342/70 |
| 2006/0012511 | A1 * | 1/2006 | Dooi | G01S 13/08 342/70 |
| 2006/0161871 | A1 * | 7/2006 | Hotelling | G06F 3/0485 715/863 |
| 2006/0234635 | A1 * | 10/2006 | Riordan | A61B 5/0022 455/67.11 |
| 2009/0160698 | A1 * | 6/2009 | Wu | G01S 7/023 342/28 |
| 2009/0278727 | A1 * | 11/2009 | Inaba | G01S 7/023 342/112 |
| 2011/0084879 | A1 * | 4/2011 | Brown | H01Q 3/2647 342/370 |
| 2011/0250928 | A1 * | 10/2011 | Schlub | H01Q 1/243 455/550.1 |
| 2013/0172045 | A1 * | 7/2013 | Caballero | H04W 52/246 455/552.1 |
| 2013/0257643 | A1 * | 10/2013 | Inomata | G01S 7/023 342/70 |
| 2014/0064264 | A1 * | 3/2014 | Morita | H04J 13/0014 370/350 |
| 2014/0206297 | A1 * | 7/2014 | Schlub | H04B 1/401 455/77 |
| 2015/0070204 | A1 * | 3/2015 | Shirakawa | G01S 13/34 342/90 |
| 2015/0301172 | A1 * | 10/2015 | Ossowska | G01S 13/878 342/70 |
| 2016/0284213 | A1 * | 9/2016 | Cao | G01S 7/415 |
| 2016/0327634 | A1 * | 11/2016 | Katz | G01S 7/411 |
| 2016/0363648 | A1 * | 12/2016 | Mindell | G01S 13/74 |
| 2016/0363659 | A1 * | 12/2016 | Mindell | G01S 13/89 |
| 2017/0290011 | A1 * | 10/2017 | Kushnir | H01Q 3/36 |
| 2018/0095162 | A1 * | 4/2018 | Fetterman | G01S 7/023 |
| 2018/0252797 | A1 * | 9/2018 | Frick | G01S 13/345 |
| 2018/0259632 | A1 * | 9/2018 | Kishigami | G01S 7/288 |
| 2018/0267144 | A1 * | 9/2018 | Lin | G01S 13/10 |
| 2018/0287651 | A1 * | 10/2018 | Fernando | H01Q 1/245 |
| 2019/0044485 | A1 * | 2/2019 | Rao | G01S 3/14 |
| 2019/0377075 | A1 * | 12/2019 | Tsfati | G01S 13/04 |

* cited by examiner

RADAR INTERFERENCE MITIGATION USING A PSEUDORANDOM OFFSET

CROSS-REFERENCE TO RELATED APPLICATION(S)

This application claims the benefit of U.S. Provisional Application No. 62/668,061, filed 7 May 2018, the disclosure of which is hereby incorporated by reference in its entirety herein.

TECHNICAL FIELD

This disclosure relates generally to wireless transceivers and, more specifically, to mitigating co-channel interference between or among multiple user devices performing proximity detection.

BACKGROUND

To increase transmission rates and throughput, cellular and other wireless networks are using signals with higher frequencies and smaller wavelengths. As an example, fifth generation (5G)-capable devices or wireless local area network (WLAN)-capable devices communicate with networks using frequencies that include those at or near the extremely-high frequency (EHF) spectrum (e.g., frequencies greater than 24 gigahertz (GHz)) with wavelengths at or near millimeter wavelengths. These signals have various technological challenges, such as higher path loss as compared to signals for earlier generations of wireless communications. In certain scenarios it can be difficult for a mmW wireless signal to travel far enough to make cellular or WLAN communications feasible at these higher frequencies.

Transmit power levels can be increased or beamforming can concentrate energy in a particular direction to compensate for the higher path loss. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to achieve given cost, size, functional design objectives, and/or other relevant constraints.

SUMMARY

An apparatus is disclosed that implements radar interference mitigation using a pseudorandom offset, which enables multiple computing devices located within physical proximity of one another to utilize radar-based techniques for proximity detection. The described techniques avoid false detections by enabling each computing device to perform proximity detection based on a unique pseudorandom offset, which can comprise a frequency offset or a time offset. The pseudorandom offset can be generated according to a pseudorandom-number generator process. In some cases, a cooperative selection process can be used to increase a likelihood that each computing device utilizes a different sequences of pseudorandom offsets. Through use of the pseudorandom offset, potential false echoes resulting from co-channel radar signals are shifted to a time or frequency that corresponds to a distance that is outside a proximity region (e.g., a region of interest). Accordingly, the computing device is able to distinguish between radar signals that are transmitted from other computing devices and reflections from an object that result from self-transmitted radar signals. Using these techniques, multiple computing devices can perform proximity detection within a frequency channel without interfering with one another or appreciably increasing a false alarm rate.

In an example aspect, an apparatus is disclosed. The apparatus includes an antenna array and a wireless transceiver. The wireless transceiver is coupled to the antenna array and is configured to transmit, via the antenna array, a radar transmit signal based on at least one pseudorandom offset. The wireless transceiver is also configured to receive, via the antenna array, at least a portion of another radar transmit signal from another apparatus. The wireless transceiver is additionally configured to receive, via the antenna array, a radar receive signal that includes a portion of the radar transmit signal that is reflected by an object. At a given time, a frequency of the radar receive signal is different than a frequency of the radar transmit signal based on the at least one pseudorandom offset.

In an example aspect, an apparatus is disclosed. The apparatus includes an antenna array and a wireless transceiver. The wireless transceiver is coupled to the antenna array and is configured to transmit multiple radar transmit signals via the antenna array. The multiple radar transmit signals have respective center frequencies that differ from each other based on respective frequency offsets. The wireless transceiver is also configured to receive multiple radar receive signals via the antenna array. At least one radar receive signal of the multiple radar receive signals includes a portion of at least one radar transmit signal of the multiple radar transmit signals that is reflected by an object. The wireless transceiver is additionally configured to adjust a transmission parameter based on the at least one radar receive signal. The transmission parameter varies according to a distance to the object.

In an example aspect, an apparatus is disclosed. The apparatus includes offset generation means for generating respective frequency offsets according to a pseudorandom number generation process. The apparatus also includes an antenna array and a wireless transceiver. The wireless transceiver is coupled to the antenna array and the offset generation means. The wireless transceiver is configured to transmit multiple radar transmit signals via the antenna array. The multiple radar transmit signals have respective center frequencies that differ from each other based on the respective frequency offsets. The wireless transceiver is also configured to receive multiple radar receive signals via the antenna array. At least one radar receive signal of the multiple radar receive signals includes a portion of at least one radar transmit signal of the multiple radar transmit signals that is reflected by an object. The wireless transceiver is additionally configured to adjust a transmission parameter based on the at least one radar receive signal. The transmission parameter varies according to a distance to the object.

In an example aspect, a method for radar interference mitigation using a pseudorandom offset is disclosed. The method includes generating respective frequency offsets according to a pseudorandom number generation process and transmitting multiple radar transmit signals. The multiple radar transmit signals have respective center frequencies that differ from each other based on the respective frequency offsets. The method also includes receiving multiple radar receive signals. At least one radar receive signal of the multiple radar receive signals includes a portion of at least one radar transmit signal of the multiple radar transmit signals that is reflected by an object. The method additionally includes adjusting a transmission parameter based on the at least one radar receive signal. The transmission parameter varies according to a distance to the object.

BRIEF DESCRIPTION OF DRAWINGS

FIG. 4-1 illustrates an example operating environment in which multiple computing devices employ radar interference mitigation using a frequency offset.

FIG. 4-2 illustrates another example operating environment in which multiple computing devices employ radar interference mitigation using a time offset.

FIG. 4-3 illustrates example beat frequencies resulting from frequency offsets and time offsets.

DETAILED DESCRIPTION

Figure 1:
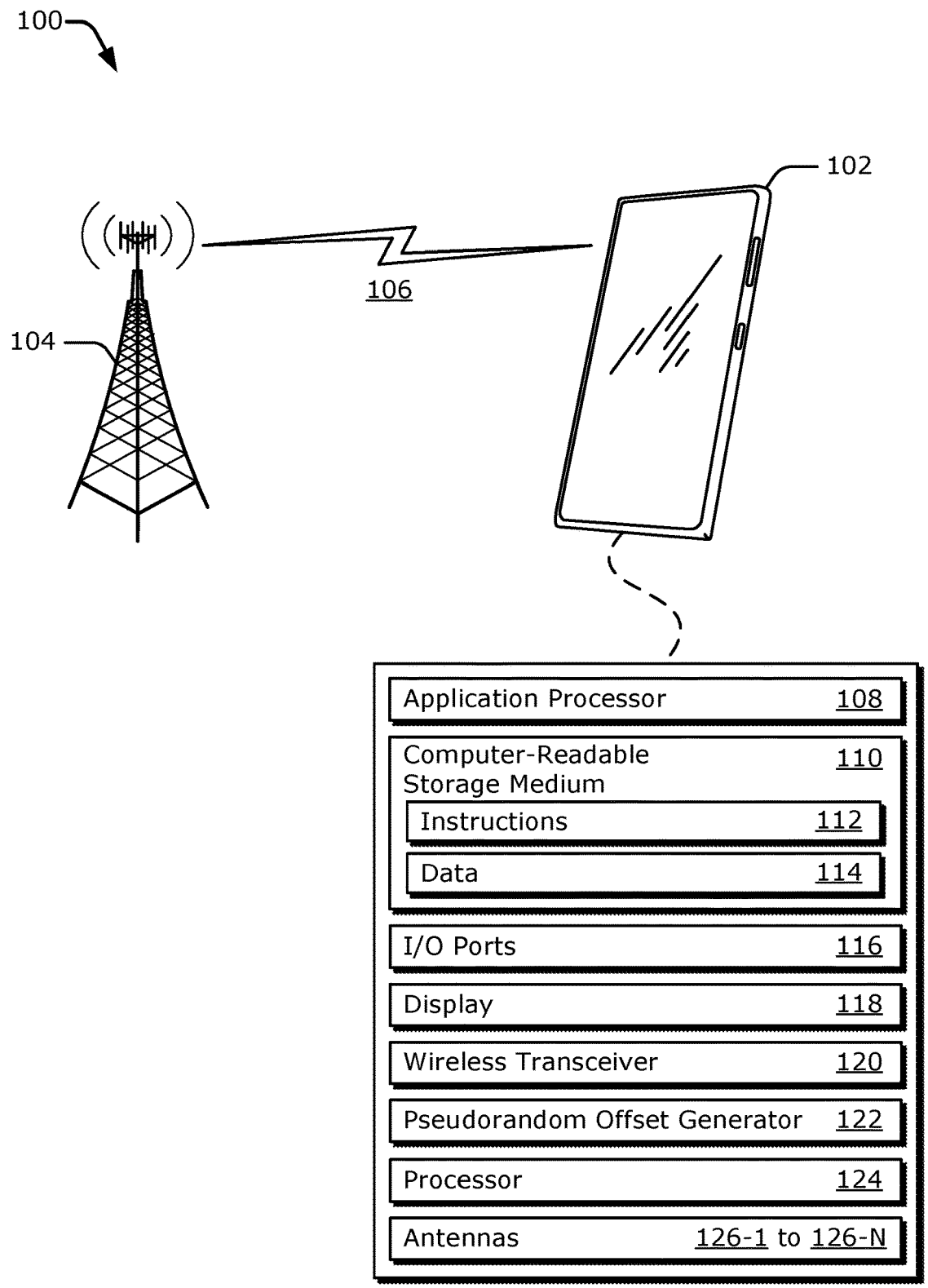
FIG. 1 illustrates an example computing device for radar interference mitigation using a pseudorandom offset.

Current high-frequency and small-wavelength communications struggle to balance performance with an obligation to meet the Federal Communications Commission's maximum permitted exposure limit (e.g., the FCC's MPE limit) This struggle can prevent devices from taking full advantage of increased data rates (e.g., those enabled by millimeter wavelength (mmW) wireless communications, such as those for a 5G standard and some newer WLAN standards). Because the MPE limit is affected by the proximity of a user to a device's antenna, however, techniques described in this document enable greater wireless performance while staying within the FCC's MPE limit. To do so, these techniques detect a user's proximity to a device. Based on the detected proximity, the device can balance a power density of transmitted wireless signals with the obligation to meet the MPE limit. As a result, the device is permitted to transmit wireless signals with higher average power levels, which enables the wireless signals to travel farther, such as between a smart phone and a remote cellular base station.

Some proximity-detection techniques may use a dedicated sensor to detect the user, such as a camera or an infrared sensor. However, these sensors may be bulky or expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for radar interference mitigation using a pseudorandom offset enable multiple computing devices located within physical proximity of one another to utilize radar-based techniques for proximity detection. The described techniques avoid false detections by enabling each computing device to perform proximity detection based on a unique pseudorandom offset, which can comprise a frequency offset or a time offset. The pseudorandom offset can be generated according to a pseudorandom number generator process. In some cases, a cooperative selection process can be used to increase a likelihood that each computing device utilizes a different sequences of pseudorandom offsets. Through use of the pseudorandom offset, potential false echoes resulting from co-channel radar signals are shifted to a time or frequency that corresponds to a distance that is outside a proximity region (e.g., a region of interest). Accordingly, the computing device is able to distinguish between radar signals that are transmitted from other computing devices and reflections from an object that result from self-transmitted radar signals. Using these techniques, multiple computing devices can perform proximity detection within a frequency channel without interfering with one another or appreciably increasing a false alarm rate.

Based on a determination of a range (e.g., a distance or slant range) to a proximate object, a transmission parameter that is used for wireless communication can be adjusted to enable the wireless transceiver to meet guidelines promulgated by the government or the wireless industry, such as the MPE limit as determined by the FCC. By actively measuring the range to the object, a surrounding environment can be continually monitored and the transmission parameter can be incrementally adjusted based on the range measurement to account for movement of the object or the device.

FIG. 1 illustrates an example computing device 102 for radar interference mitigation using a pseudorandom offset. In an example environment 100, the computing device 102 communicates with a base station 104 through a wireless communication link 106 (wireless link 106). In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, wearable computer, server, network-attached storage (NAS) device, smart appliance or other internet of things (IoT) device, medical device, vehicle-based communication system, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, server device, terrestrial television broadcast tower, access point, peer-to-peer device, mesh network node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as second-generation (2G), third-generation (3G), fourth-generation (4G), fifth-generation (5G), IEEE 802.11 (e.g., Wi-Fi™), IEEE 802.15 (e.g., Bluetooth™), IEEE 802.16 (e.g., WiMAX™), and so forth. In some implementations, the wireless link 106 may wirelessly provide power and the base station 104 may comprise a power source.

As shown, the computing device 102 includes an application processor 108 and a computer-readable storage medium 110 (CRM 110). The application processor 108 may include any type of processor that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving signals via one or more antennas 126-1 to 126-N, where N represents a positive integer. Components of the wireless transceiver 120 can include amplifiers, mixers, switches, analog-to-digital converters, filters, and so forth for conditioning the communication signals (e.g., for generation or processing signals). The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antennas 126-1 to 126-N. Example circuits within the wireless transceiver 120 are further described with respect to FIG. 6. For proximity detection, the wireless transceiver 120 transmits and receive radar signals via the antennas 126-1 to 126-N.

The computing device 102 includes a pseudorandom offset generator 122 and a processor 124. The pseudorandom offset generator 122 can be implemented within the wireless transceiver 120, within the processor 124, or as an independent module that is separate from both the wireless transceiver 120 and the processor 124. The pseudorandom offset generator 122 generates (e.g., creates, computes, or selects) a pseudorandom offset for proximity detection. In general, the pseudorandom offset generator 122 uses an algorithm or mathematical process to determine the pseudorandom offset. Example types of pseudorandom processes include a multiply-with-carry (MWC) method, a Blum Blum Shub (B.B.S.) algorithm, a middle-square method, and so forth. In some cases, a seed is provided as an input to the pseudorandom offset generator 122. Based on the seed, the algorithm generates a sequence of pseudorandom offsets (e.g., pseudorandom numbers). Within the sequence, the pseudorandom offsets vary such that a different pseudorandom offset is used for each radar signal that is transmitted via the wireless transceiver 120. In general, the algorithm is designed to provide a sufficient quantity of unique pseudorandom offsets that can be employed for a large quantity of similarly-located computing devices 102. The pseudorandom offset can be applied in an analog or a digital domain, and to any frequency stage within the transmit and receive chain (e.g., a radio-frequency stage, an intermediate-frequency stage, or a baseband-frequency stage). As used herein, a pseudorandom number or offset can comprise an approximately true random number or offset that is alternatively or additionally derived using a random physical phenomenon, which can be obtained using a receiver or sensor.

In some cases, the pseudorandom offset generator 122 can use inter-device cooperation techniques to select a unique pseudorandom offset relative to other computing devices. A cooperation technique can, for example, cause the pseudorandom offset generator 122 to select a unique seed for the pseudorandom number generation process relative to other seeds used by other pseudorandom offset generators of other computing devices. Employing the unique seed can generate a sequence of pseudorandom offsets that is different and unlikely to result in the computing device 102 using a same pseudorandom offset as another computing device. The pseudorandom offset generator 122 can at least partially implement radar interference mitigation using a pseudorandom offset as described herein.

The processor 124 can be implemented within or separate from the wireless transceiver 120. The processor 124, which can be implemented as a modem, controls the wireless transceiver 120 and enables wireless communication or proximity detection to be performed. Although not explicitly shown, the processor 124 can include a portion of the CRM 110 or can access the CRM 110 to obtain computer-readable instructions. The processor 124 can include baseband circuitry to perform high-rate sampling processes that can include analog-to-digital conversion, digital-to-analog conversion, Fourier transforms, gain correction, skew correction, frequency translation, and so forth. The processor 124 can provide communication data to the wireless transceiver 120 for transmission. The processor 124 can also process a baseband version of a signal obtained from the wireless transceiver 120 to generate data, which can be provided to other parts of the computing device 102 via a communication interface for wireless communication or proximity detection.

Although not explicitly depicted, the wireless transceiver 120 or the processor 124 can also include a controller. The controller can include at least one processor and at least one CRM, such as the application processor 108 and the CRM 110. The CRM can store computer-executable instructions, such as the instructions 112. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the processor 124, a modem, a general-purpose processor, a processor designed to facilitate wireless communication or to perform MPE techniques, some combination thereof, and so forth.

In general, the processor 124 or the controller can control an operational mode of the wireless transceiver 120 or have knowledge of a current operational mode. Different types of operational modes may include different power modes (e.g., a low-power mode or a high-power mode), different resource control states (e.g., a connected mode, an inactive mode, or an idle mode), different modulation modes (e.g., a lower-order modulation mode such as quadrature phase-shift keying (QPSK) modes or higher-order modulation modes such as 64 quadrature amplitude modulation (QAM) or 256 QAM), and so forth.

Figure 2:
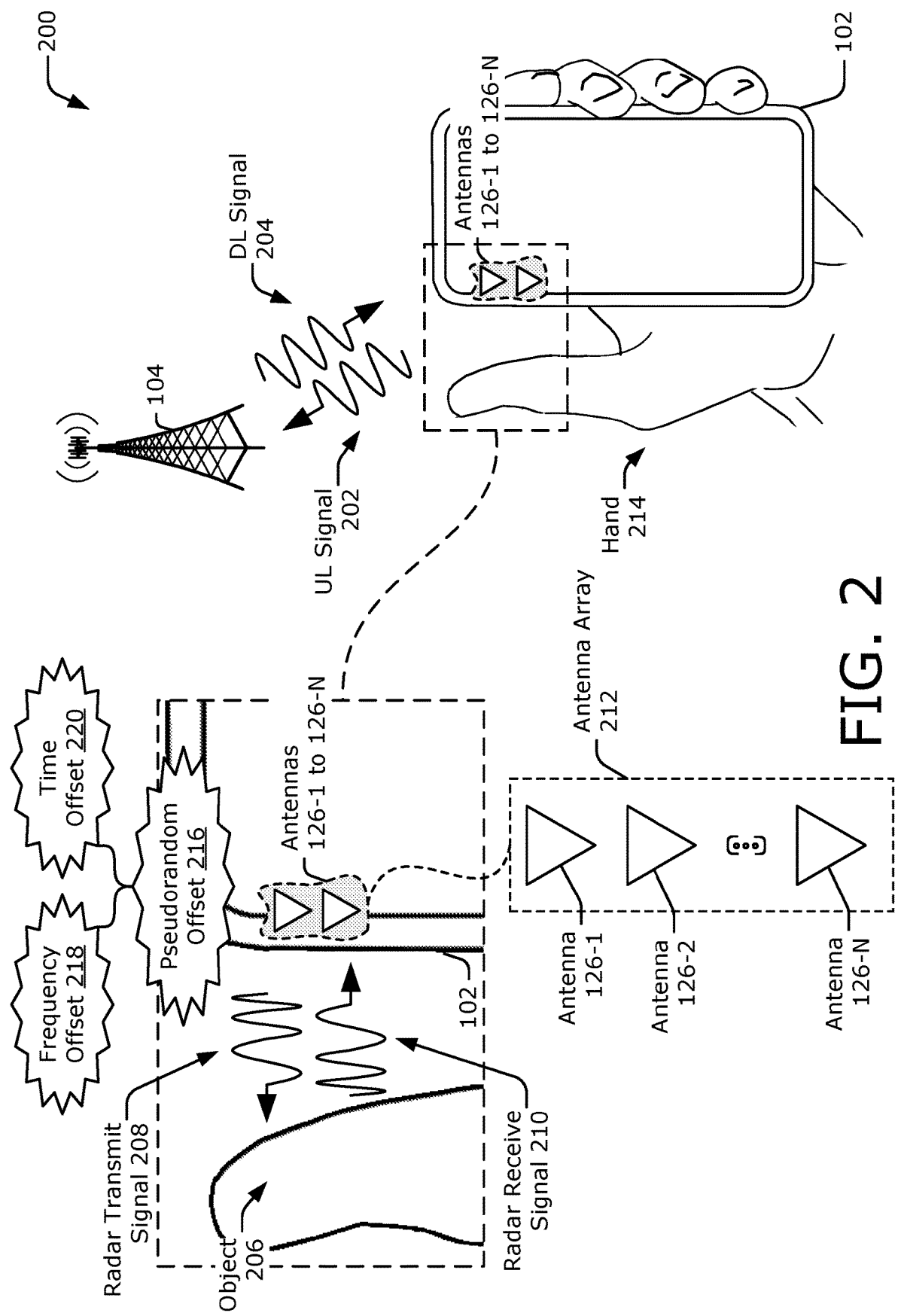
FIG. 2 illustrates an example operating environment for proximity detection that includes radar interference mitigation using a pseudorandom offset.

FIG. 2 illustrates an example operating environment 200 for proximity detection that includes radar interference mitigation using a pseudorandom offset. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via one or more of the antennas 126-1 to 126-N. A user's thumb, however, can represent a proximate object 206 that may be exposed to radiation via the uplink signal 202.

To detect whether the object 206 exists or is within a detectable range, pulse-Doppler radar techniques can be used to transmit a radar transmit signal 208 and receive a radar receive signal 210 via at least one antenna 126-1 to 126-N. In other cases, continuous-wave radar techniques can be used to receive the radar receive signal 210 during at least a portion of time that the radar transmit signal 208 is transmitted using different antennas 126-1 to 126-N. As such, the antennas 126-1 to 126-N may comprise one antenna, at least two different antennas, at least two antennas implemented as antenna elements within an antenna array 212 (as shown towards the bottom of FIG. 2), or at least two antennas implemented as antenna elements within different antenna arrays.

The antenna array 212 is shown to include the antennas 126-1 to 126-N. A distance between the antennas 126-1 to 126-N within the antenna array 212 can be based on frequencies that the wireless transceiver 120 emits. For example, adjacent antennas 126-1 to 126-N can be spaced by approximately half a wavelength from one another (e.g., by approximately half a centimeter (cm) apart for frequencies around 30 GHz). The antennas 126-1 to 126-N may be implemented using any type of antenna, including patch antennas, dipole antennas, bowtie antennas, single-polarized antennas, dual-polarized antennas, or a combination thereof.

The radar transmit signal 208 can comprise a frequency-modulated pulsed signal or a frequency-modulated continuous-wave (FMCW) signal. Generally the radar transmit signal 208 is modulated according to a linear frequency modulation, a triangular frequency modulation, a sawtooth frequency modulation, and so forth. The pseudorandom offset generator 122 of FIG. 1 generates a pseudorandom offset 216 that can be used to transmit the radar transmit signal 208 and receive the radar receive signal 210.

Figure 3:
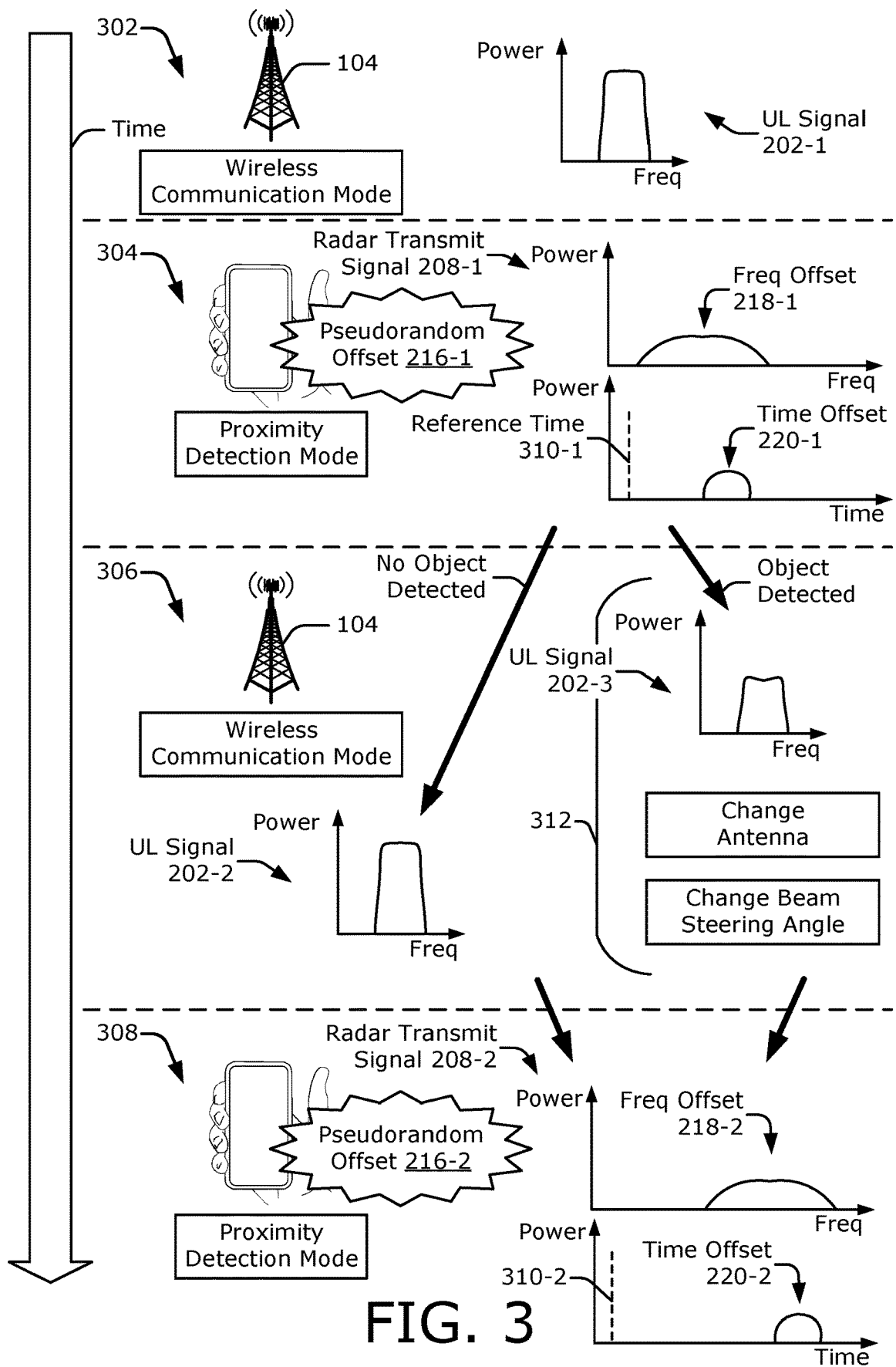
FIG. 3 illustrates an example sequence flow diagram for radar interference mitigation using a pseudorandom offset.
Figures 1, 4:
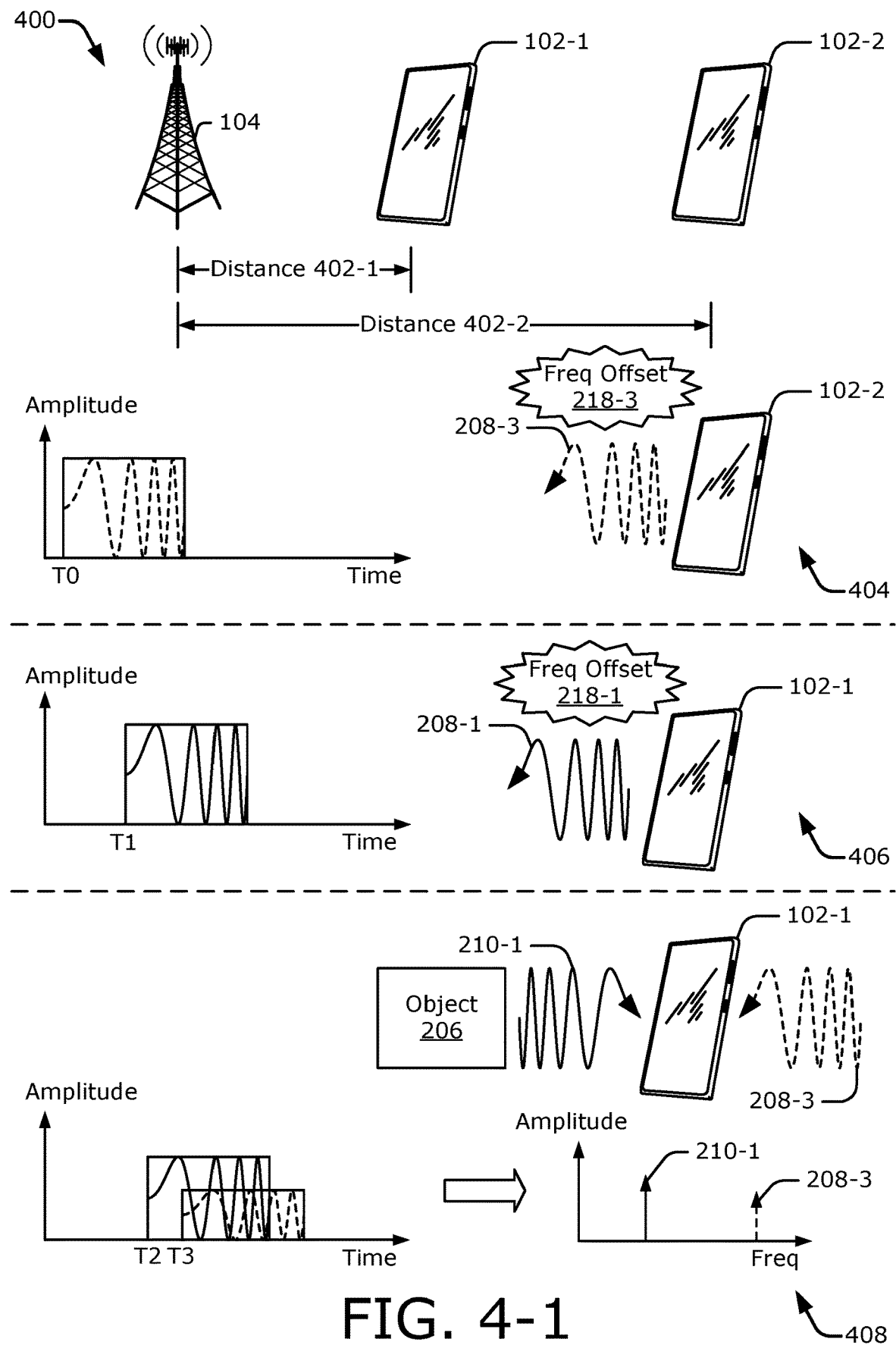
Figures 2, 4:
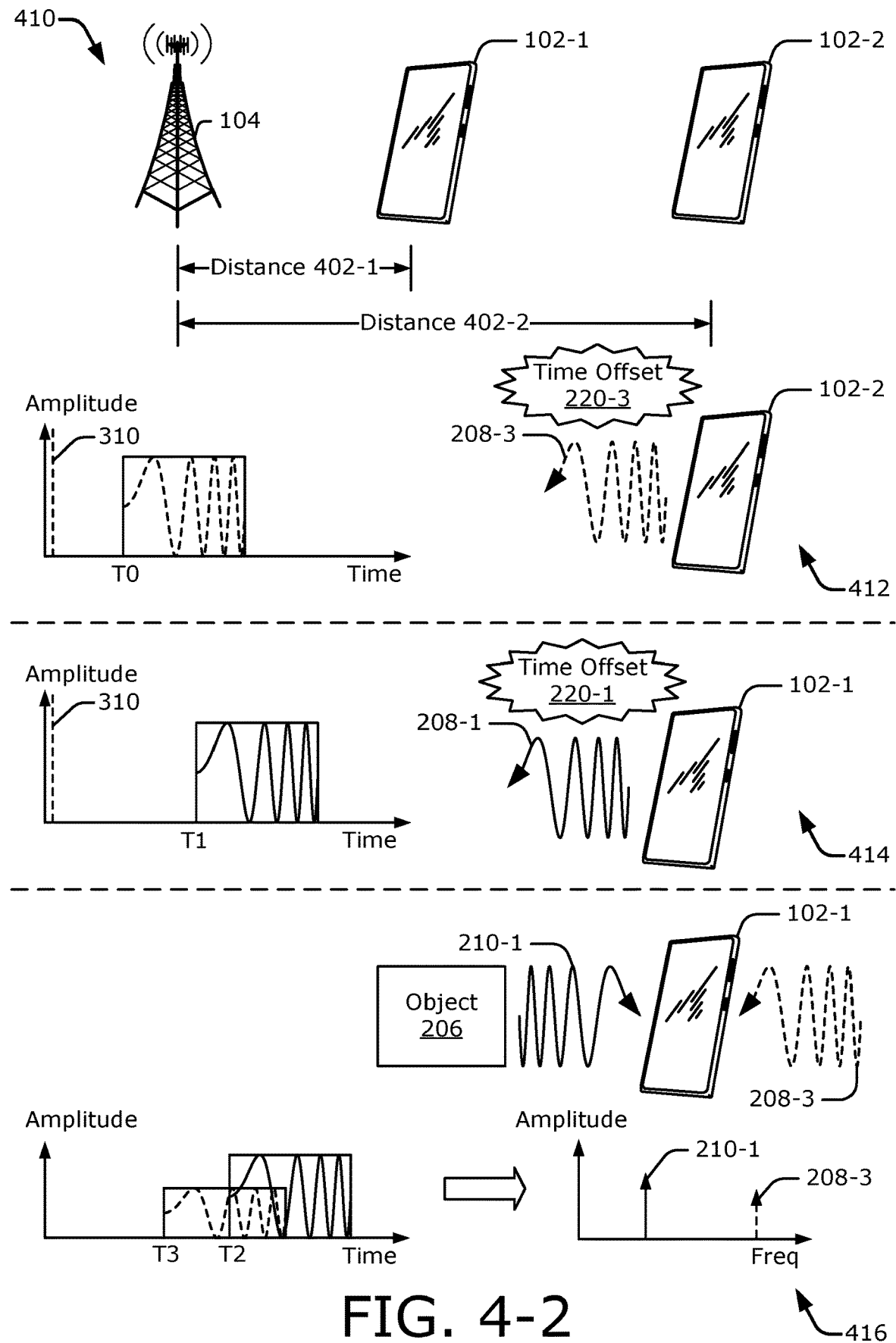
Figures 3, 4:
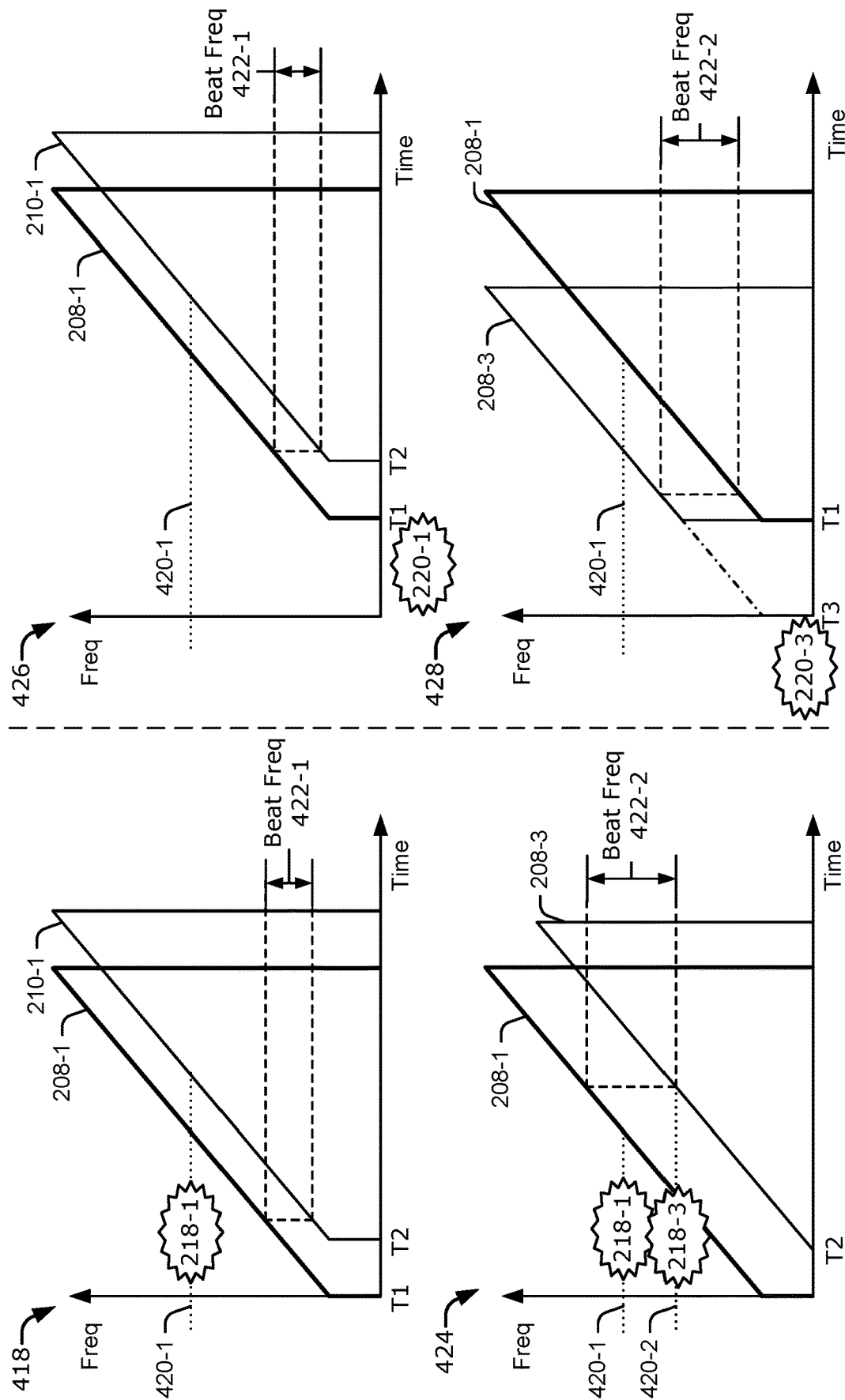

The pseudorandom offset 216 can include a frequency offset 218 or a time offset 220. The frequency offset 218 affects a center frequency of the radar transmit signal 208, as shown in FIG. 4-3. In general, the frequency offset 218 is relatively small compared to a radio frequency used to transmit the radar transmit signal 208. For example, if the radar transmit signal 208 includes frequencies on the order of gigahertz (GHz) (e.g., frequencies between approximately 2 and 40 GHz), the frequency offset 218 may be on the order of megahertz. The time offset 220 determines a time at which the radar transmit signal 208 is transmitted. In particular, the time offset 220 causes the transmission of the radar transmit signal 208 to be delayed relative to a reference time.

The processor 124 analyzes the radar receive signal 210 to detect the object 206 and determine a range to the object 206. Based on the range, the processor 124 generates at least one transmission parameter that controls one or more transmission attributes for wireless communication. The transmission parameter 312 can specify one or more transmission-related aspects of a next uplink signal 202, such as a power level, polarization, frequency, duration, beam shape, beam steering angle, a selected antenna that transmits the uplink signal 202 (e.g., another antenna that is on a different surface of the computing device 102 and is not obstructed by the object 206), or combinations thereof. By specifying the transmission parameter, the processor 124 can, for example, cause the wireless transceiver 120 to decrease power if an object 206 is close to the computing device 102 or increase power if the object 206 is at a farther range or is not detectable. The ability to detect the object 206 and control the transmission of the uplink signal 202 enables the processor 124 to balance the performance of the computing device 102 with compliance guidelines. In other implementations, the application processor 108 can perform one or more of these functions. An example sequence for switching between wireless communication and proximity detection is further described with respect to FIG. 3.

FIG. 3 illustrates an example sequence flow diagram for radar interference mitigation using a pseudorandom offset 216, with time elapsing in a downward direction. Examples of a wireless communication mode are shown at 302 and 306, and examples of a proximity detection mode are shown at 304 and 308. The proximity detection modes can occur at fixed time intervals, between active data cycles that occur during wireless communication, at predetermined times as set by the processor 124, as part of an initialization process before wireless communications occur, or based on indications that the user may be proximate to the device (e.g., based on the wireless transceiver 120 observing a decrease in power in a downlink signal 204 or the application processor 108 determining that the user is interacting with the display 118 of the computing device 102).

At 302, the wireless transceiver 120 (of FIG. 1) transmits a high-power (e.g., normal) uplink signal 202-1 configured to provide sufficient range to reach the base station 104.

After transmitting the uplink signal 202-1, the wireless transceiver 120 transmits the radar transmit signal 208-1 at 304. As described above, the radar transmit signal 208-1 enables the computing device 102 to detect the object 206 (e.g., a user's appendage) and determine if the object 206 is near the computing device 102. In this case, the radar transmit signal 208-1 is represented by a low-power wideband signal.

At 304, transmission of the radar transmit signal 208-1 is affected by a pseudorandom offset 216-1, which can comprise a frequency offset 218-1, a time offset 220-1, or a combination thereof. The frequency offset 218-1 adjusts a center frequency of the radar transmit signal 208-1. The time offset 220-1 adjusts a time at which the radar transmit signal 208-1 is transmitted relative to a reference time 310-1. If the object 206 is detected, the wireless transceiver 120 can adjust a transmission parameter 312 for a next uplink signal 202 to account for MPE compliance guidelines.

The proximity detection mode can also determine the range to the object 206, thereby enabling transmission of a next uplink signal to comply with range-dependent guidelines, such as a maximum power density. Because power density is proportional to transmit power and inversely proportional to range, an object 206 at a closer range is exposed to a higher power density than another object 206 at a farther range for a same transmit power level. Therefore, a similar power density at the object 206 can be achieved by increasing the transmit power level if the object 206 is at a farther range and decreasing the transmit power level if the object 206 is at a closer range. In this way, the wireless transceiver 120 can adjust transmission of the uplink signal 202 to enable the power density at the object 206 for both the closer range and the farther range to be below the maximum power density. At the same time, because the range is known, the transmit power level can be increased to a level that facilitates wireless communication and still comports with the compliance guideline.

At 306, the wireless transceiver 120 transmits the next uplink signal. In the depicted example, a high-power uplink signal 202-2 is transmitted if the object 206 is not detected. Alternatively, a low-power uplink signal 202-3 is transmitted if the object 206 is detected. A power of the low-power uplink signal 202-3 can be, for example, between approximately five and twenty decibels (dB) less than a power of the high-power signal at 302. In addition to or instead of changing the power, the uplink signal 202-3 can be transmitted using a different antenna 126-1 to 126-N within the computing device 102 or a different beam steering angle (e.g., different than the antenna 126-1 to 126-N or the beam steering angle used for transmitting the uplink signal 202-1 at 302). Although not shown, the wireless transceiver 120 can alternatively skip the wireless communication mode at 306 and perform another proximity detection operation using another antenna or a different transmit power level to detect objects 206 at various locations or distances around the computing device 102.

At 308, the wireless transceiver 120 transmits another radar transmit signal 208-2 to attempt to detect the object 206. In this example, the pseudorandom offset generator 122 selects another pseudorandom offset 216-2. The pseudorandom offset 216-2 can comprise a next pseudorandom offset in a sequence generated based on a seed. Similar to the pseudorandom offset 216-1, the pseudorandom offset 216-2 can comprise a frequency offset 218-2, a time offset 220-2, or a combination thereof.

In some cases, the frequency offset 218-2 differs from the frequency offset 218-1 such that a center frequency of the radar transmit signal 208-2 at 308 differs from a center frequency of the radar transmit signal 208-1 at 304. In this example, a difference between the frequency offset 218-2 and the frequency offset 218-1 causes the center frequency of the radar transmit signal 208-2 to be higher than the center frequency of the radar transmit signal 208-1. The difference between the frequency offsets 218-1 and 218-2 can be on the order of megahertz (MHz) (e.g., 0.5 MHz, 1 MHz, 2 MHz, or more).

The time offset 220-2 can also differ from the time offset 220-1 in some cases. As such, a relative time period during which the radar transmit signal 208-2 is transmitted with respect to the reference time 310-2 at 308 differs from the relative time period that the radar transmit signal 208-2 is transmitted with respect to the reference time 310-1 at 304. In this example, a difference between the time offset 220-2 and the time offset 220-1 causes a delay associated with transmitting the radar transmit signal 208-2 relative to the reference time 310-2 to be longer compared to a delay associated with transmitting the radar transmit signal 208-1 relative to the reference time 310-1. The difference between the time offsets 220-1 and 220-2 can be on the order of microseconds (µs) (e.g., greater than or equal to one microsecond).

By scheduling multiple radar transmit signals 208 over some time period, transmission of subsequent uplink signals 202 can be dynamically adjusted based on a changing environment or movement by the object 206. Furthermore, appropriate adjustments can be made to balance communication performance with compliance or radiation requirements. In some cases, there may be another computing device 102 that is nearby and transmitting another radar transmit signal. By using both of the pseudorandom offsets 216-1 and 216-2 at 304 and 308, the computing device 102 can filter the other radar transmit signal and prevent the other radar transmit signal from becoming a potential false echo (e.g., being incorrectly interpreted as a reflection from the object 206), as further described with respect to FIGS. 4-1 to 5.

FIG. 4-1 illustrates another example operating environment 400 in which multiple computing devices 102-1 and 102-2 employ radar interference mitigation using frequency offsets 218. In the depicted environment 400, a first computing device 102-1 and a second computing device 102-2 are respectively located at distances 402-1 and 402-2 from the base station 104, and the second computing device 102-2 is located farther from the base station 104 than the first computing device 102-1. In some cases, the distances 402-1 and 402-2 can be substantially different such that an uplink signal 202 transmitted from the second computing device 102-2 takes a substantially longer time to arrive at the base station 104 than another uplink signal 202 transmitted from the first computing device 102-1. To support time-division multiple access (TDMA) communications, a timing of a transmission by the computing device 102-2 can be advanced to compensate for the additional propagation distance and to ensure that the uplink signal 202 transmitted from the second computing device 102-2 arrives at the base station 104 within a designated time slot. In other cases, the distances 402-1 and 402-2 can be relatively similar In general, a distance between the object 206 and the computing device 102-1 is smaller than a distance between the first computing device 102-1 and the second computing device 102-2.

At 404 and 406, the second computing device 102-2 and the first computing device 102-1 respectively transmit radar transmit signals 208-3 and 208-1 starting at respective times T0 and T1. The radar transmit signals 208-1 and 208-3 are transmitted with different frequency offsets 218-1 and 218-3, respectively. The difference between the frequency offsets 218-1 and 218-3 can be greater than 0.5 MHz, 1 MHz, 2 MHz, or more. In some cases (e.g., due to the timing advance), transmission of the radar transmit signal 208-3 occurs before or during transmission of the radar transmit signal 208-1. This causes at least a portion of the radar transmit signal 208-3 to be present at the first computing device 102-1 while the first computing device 102-1 receives a radar receive signal 210-1, as shown at 408.

At 408, the first computing device 102-1 begins to receive the radar receive signal 210-1 that is reflected by the object 206 based on the radar transmit signal 208-1 at time T2. Along with the radar receive signal 210-1, the first computing device 102-1 also receives at least a portion of the radar transmit signal 208-3 that is transmitted from the second computing device 102-2. In this example, the radar transmit signal 208-3 is received starting at time T3. In an example operation, the first computing device 102-1 performs a beating operation that respectively mixes the radar receive signal 210-1 and the radar transmit signal 208-3 with the radar transmit signal 208-1 to produce respective beat frequencies, which are shown in a frequency domain towards the bottom of FIG. 4-1. In general the beat frequency comprises a frequency indicative of a frequency difference between two signals that are beat (e.g., mixed) together.

In some implementations, this beating operation enables the computing device 102-1 to compensate for the frequency offset 218-1 because the frequency difference between the radar transmit signal 208-1 and the radar receive signal 210-1 effectively removes the frequency offset 218-1. This enables the resulting beat frequency associated with the radar receive signal 210-1 to be proportional to a round-trip delay of the radar transmit signal 208-1 and radar receive signal 210-1 traveling between the computing device 102-1 and the object 206. The resulting beat frequency can therefore be used to determine a range to the object 206. Other post-processing techniques can also be used to enable the computing device 102-1 to compensate for the frequency offset 218-1 after the beating operation, as further described with respect to FIG. 9.

A frequency difference between the radar transmit signal 208-1 and the radar transmit signal 208-3, however, includes a difference between the frequency offset 218-1 and the frequency offset 218-3. This difference causes the beat frequency associated with the radar transmit signal 208-3 to be mapped to a distance that is outside a proximity region (e.g., region of interest) that is monitored by the computing device 102-1. Accordingly, the computing device 102-1 can filter or disregard the potential false echo caused by the radar transmit signal 208-3. In this way, the frequency offset 218-1 enables the computing device 102-1 to distinguish between signals that are reflected by nearby objects and radar transmit signals that are transmitted from other devices. The computing device 102-1 can additionally or alternatively use a time offset 220, as further described with respect to FIG. 4-2.

FIG. 4-2 illustrates another example operating environment 410 in which multiple computing devices 102-1 and 102-2 employ radar interference mitigation using time offsets 220. Similar to the environment 400 in FIG. 4-1, the first computing device 102-1 and the second computing device 102-2 are respectively located at the distances 402-1 and 402-2 from the base station 104. Both the first computing device 102-1 and the second computing device 102-2 have knowledge of a reference time 310, which can be a common time established via the base station 104.

At 412 and 414, the second computing device 102-2 and the first computing device 102-1 respectively begin to transmit the radar transmit signals 208-3 and 208-1 at respective times T0 and T1. The radar transmit signals 208-1 and 208-3 are transmitted according to different time offsets 220-1 and 220-3, respectively. The time offsets 220-1 and 220-3 cause the transmission of the radar transmit signals 208-1 and 208-3 to be delayed by different amounts relative to the reference time 310. The difference between the time offsets 220-1 and 220-3 can be greater than one microsecond, two microseconds, or more. In some cases, the difference between the time offsets 220-1 and 220-3 can cause the radar transmit signal 208-3 to be present at the first computing device 102-1 while the first computing device 102-1 receives a radar receive signal 210-1, as shown at 416. In other cases, the difference between the time offsets 220-1 and 220-3 can cause the radar transmit signal 208-3 to not be present at the first computing device 102-1 while the first computing device 102-1 receives the radar receive signal 210-1, thereby mitigating a radar interference situation.

At 416, the first computing device 102-1 receives both the radar receive signal 210-1 that is reflected by the object 206 and at least a portion of the radar transmit signal 208-3 that is transmitted from the second computing device 102-2. In this example, the radar transmit signal 208-3 and the radar receive signal 210-1 are respectively present at the first computing device 102-1 starting at times T3 and T2. In an example operation, the first computing device 102-1 performs a beating operation that respectively mixes the radar receive signal 210-1 and the radar transmit signal 208-3 with the radar transmit signal 208-1 to produce respective beat frequencies, which are shown in a frequency domain towards the bottom of FIG. 4-2. Similar to the frequency offsets 218-1 and 218-3 of FIG. 4-1, the time offsets 220-1 and 220-3 can cause the beat frequencies associated with the radar receive signal 210-1 and the radar transmit signal 208-3 to vary substantially, as further described with respect to FIG. 4-3.

FIG. 4-3 illustrates example beat frequencies resulting from the frequency offsets 218-1 and 218-3 of FIG. 4-1 and the time offsets 220-1 and 220-3 of FIG. 4-2. In the depicted configuration, the radar transmit signals 208-1 and 208-3 are shown to be linear frequency-modulated signals (e.g., chirps). On the left side of FIG. 4-3, graph 418 illustrates frequencies of the radar transmit signal 208-1 and the radar receive signal 210-1 of FIG. 4-1 over time. Both the radar transmit signal 208-1 and the radar receive signal 210-1 have relatively similar center frequencies, as represented by a center frequency 420-1. The center frequency 420-1 is based on the frequency offset 218-1. When the radar receive signal 210-1 is received starting at time T2, the wireless transceiver 120 generates a beat frequency 422-1, which is based on a frequency difference between the radar transmit signal 208-1 and the radar receive signal 210-1. In this case, the beat frequency 422-1 is proportional to the round-trip propagation delay (e.g., a difference between T2 and T1) between the computing device 102-1 and the object 206.

Graph 424 illustrates frequencies of the radar transmit signal 208-1 and the radar transmit signal 208-3 of FIG. 4-1 over time. Due to a difference between the frequency offsets 218-1 and 218-3, respective center frequencies 420-1 and 420-2 of the radar transmit signals 208-1 and 208-3 are substantially different. In this example, the radar transmit signal 208-3 is received starting at time T2, which is approximately the same time that the radar receive signal 210-1 is first received. When the radar transmit signal 208-3 is received, the wireless transceiver 120 generates a beat frequency 422-2, which is based on a frequency difference between the radar transmit signals 208-1 and 208-3. Because the center frequencies 420-1 and 420-2 are different due to the frequency offsets 218-1 and 218-3, the beat frequency 422-2 is different than the beat frequency 422-1. This difference can be sufficient to enable the wireless transceiver 120 to filter or discard the beat frequency 422-2 even if the radar transmit signal 208-3 is received at or near the same time period as the radar receive signal 210-1.

On the right side of FIG. 4-3, graph 426 illustrates frequencies of the radar transmit signal 208-1 and the radar receive signal 210-1 over time. In this case, transmission of the radar transmit signal 208-1 is based on the time offset 220-1. Similar to graph 418, the beat frequency 422-1 represents a frequency difference between the radar transmit signal 208-1 and the radar receive signal 210-1 and is proportional to the round-trip propagation time between the computing device 102-1 and the object 206.

Graph 428 illustrates frequencies of the radar transmit signals 208-1 and 208-3. In this example, the center frequencies of the radar transmit signals 208-1 and 208-3 are relatively similar and represented by the center frequency 420-1. In contrast, the time offsets 220-1 and 220-3 are substantially different. In particular, the time offset 220-3 is shorter than the time offset 220-1 such that the radar transmit signal 208-3 is transmitted prior to the radar transmit signal 208-1 and at least a portion of the radar transmit signal 208-3 is present at the first computing device 102-1 before the radar transmit signal 208-1 is transmitted at T1 (as represented by the dotted-dashed line between T3 and T1).

Prior to T1, the first computing device 102-1 may not be in a receive mode. Upon initiating transmission of the radar transmit signal 208-1, however, the computing device 102-1 can activate the receive mode to receive the radar receive signal 210-1 along with at least a portion of the radar transmit signal 208-3. Due to the time offsets 220-1 and 220-3, the beat frequency 422-2 resulting from the radar transmit signal 208-3 is sufficiently different from the beat frequency 422-1 in graph 426. This enables the wireless transceiver 120 to filter the beat frequency 422-2 and prevent the radar transmit signal 208-3 from becoming a potential false echo (e.g., being incorrectly interpreted as a reflection from the object 206). As seen in the graphs 418, 424, 426, and 428, different types or combinations of pseudorandom offsets 216 can be used to mitigate radar interference.

Figure 5:
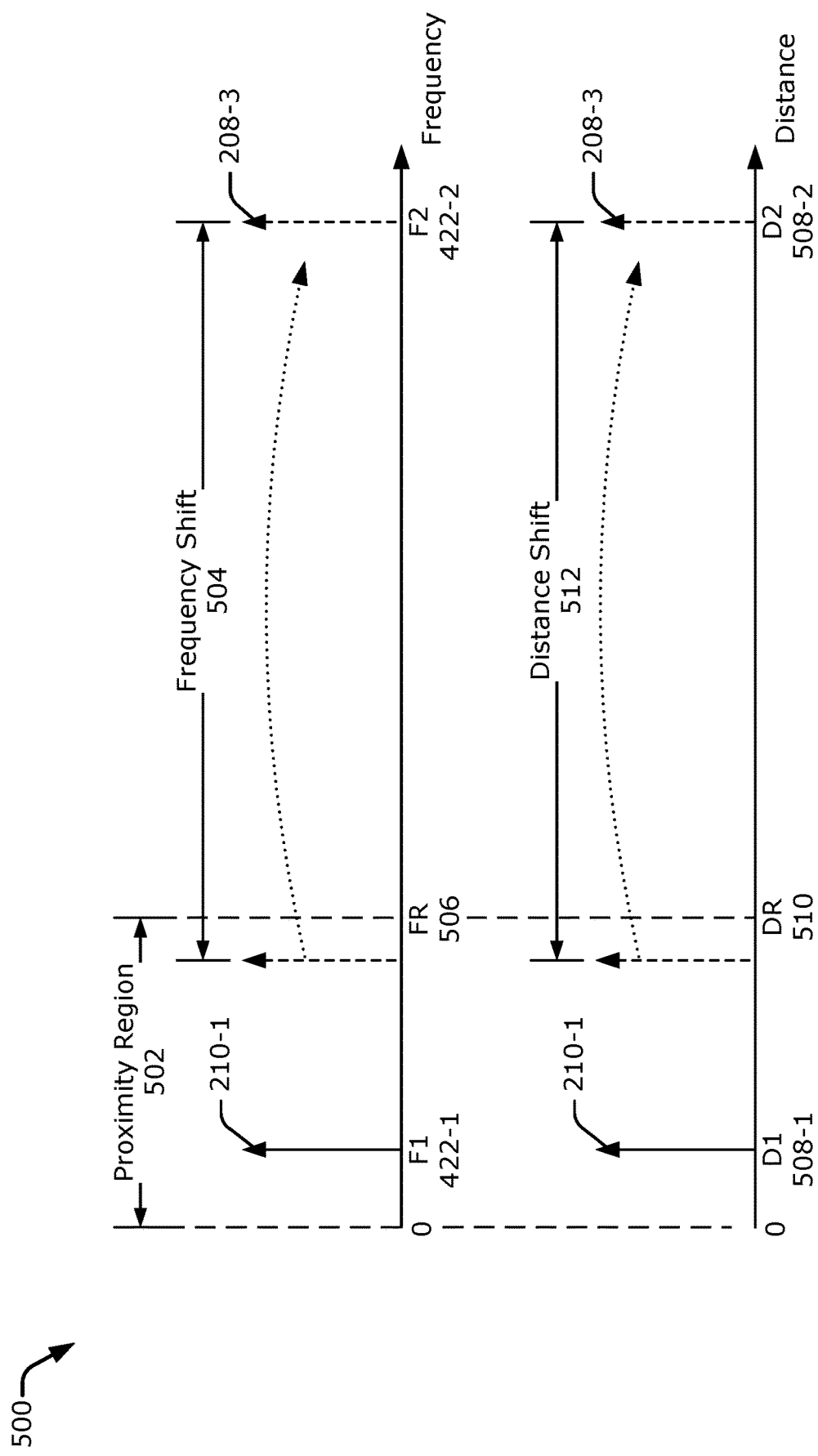
FIG. 5 illustrates an example mapping of a potential false echo for radar interference mitigation using a pseudorandom offset.

FIG. 5 illustrates an example mapping of a potential false echo for radar interference mitigation using a pseudorandom offset 216. At 500, beat frequencies 422-1 and 422-2 corresponding to the radar receive signal 210-1 and the radar transmit signal 208-3 of FIG. 4-3 are respectively labeled as F1 and F2. Due to a difference between the frequency offsets 218-1 and 218-3 or the time offsets 220-1 and 220-3, the beat frequency F2 422-2 differs from the beat frequency F1 422-1 by a significant margin. Due to this difference, the beat frequency F2 422-2 occurs outside a proximity region 502 that is monitored by the first computing device 102-1. If a pseudorandom offset 216 was not applied by the computing device 102, the beat frequency 422-2 associated with the radar transmit signal 208-3 can occur within the proximity region 502 and may result in a false alarm or false detection. By applying the pseudorandom offset 216, the beat frequency 422-2 is effectively shifted outside the proximity region 502, as shown by frequency shift 504. The proximity region 502 is represented by a range of frequencies between 0 and a frequency FR 506. The frequency shift 504 causes the beat frequency F2 422-2 to be greater than the frequency 506 (e.g., causes the beat frequency F2 422-2 to be significantly different than the beat frequency F1 422-1).

For continuous wave radar-based techniques, for example, a beat frequency is proportional to a distance R, as represented by Equation 1 below:

$$R = \frac{cf_B}{2K},\qquad \text{Equation 1}$$

where c is the speed of light, $f_B$ is the beat frequency, and K is a frequency slope of the radar transmit signal 208-1.

Accordingly, the beat frequencies F1 422-1 and F2 422-2 correspond to distances 508-1 and 508-2, respectively labeled as D1 and D2. The proximity region 502 therefore includes a distance range between 0 and a distance DR 510. The frequency shift 504 causes a corresponding distance shift 512, which maps the distance D2 508-2 to a distance greater than DR 510. As an example proximity region 502, the frequency FR 506 can correspond to a frequency that is less than or equal to 0.3 MHz and the distance DR 510 can correspond to a distance that is less than or equal to 20 centimeters (cm). In general, the frequency offsets 218-1 and 218-3 (of FIG. 4-1) or the time offsets 220-1 and 220-3 (of FIG. 4-2) are generated such that the frequency shift 504 places the beat frequency F2 422-2 outside the proximity region 502. By being outside the proximity region 502, the wireless transceiver 120 or the processor 124 can filter or disregard the beat frequency 422-2.

Figure 6:
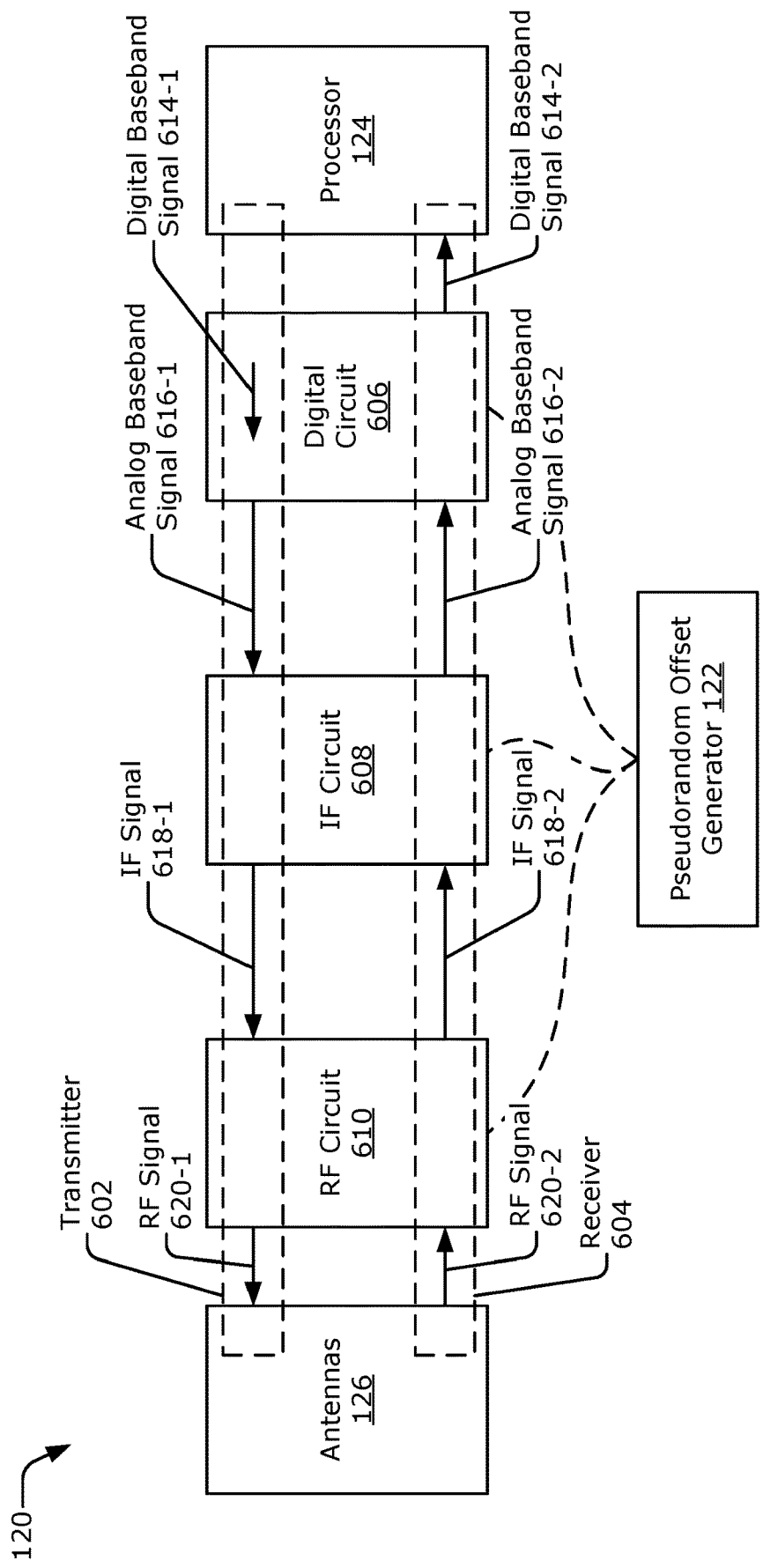
FIG. 6 illustrates an example wireless transceiver for radar interference mitigation using a pseudorandom offset.

FIG. 6 illustrates an example wireless transceiver 120 for radar interference mitigation using a pseudorandom offset 216. The wireless transceiver 120 includes a transmitter 602 and a receiver 604, which are coupled between the processor 124 and the antennas 126-1 to 126-N. The transmitter 602 and the receiver 604 are also distributed through portions of a digital circuit 606, an intermediate-frequency (IF) circuit 608 (IF circuit 608), and a radio-frequency (RF) circuit 610 (RF circuit 610). The digital circuit 606, the IF circuit 608, and the RF circuit 610 can include mixers, filters, or amplifiers to enable the wireless transceiver 120 to transmit the radar transmit signal 208 and receive the radar receive signal 210. In general, the IF circuit 608 upconverts baseband signals to an intermediate frequency and downconverts intermediate-frequency signals to baseband. The intermediate frequency can be on the order of several gigahertz (GHZ), such as between approximately 5 and 15 GHz. Likewise, the radio-frequency circuit 610 upconverts intermediate-frequency signals to radio frequencies and downconverts radio-frequency signals to intermediate frequencies. The radio frequencies can include frequencies in the extremely-high frequency (EHF) spectrum, such as frequencies between approximately 25 and 66 GHz.

Along a transmit path, which is shown via the transmitter 602, the digital circuit 606 generates a digital baseband signal 614-1. Based on the digital baseband signal 614-1, the digital circuit 606 generates an analog baseband signal 616-1. The IF circuit 608 upconverts the analog baseband signal 616-1 to produce an intermediate-frequency signal 618-1 (IF signal 618-1). The RF circuit 610 upconverts the IF signal 618-1 to generate a radio-frequency signal 620-1 (RF signal 620-1). The RF signal 620-1 is transmitted via the antennas 126-1 to 126-N. Depending on the situation or operational mode, the RF signal 620-1 may represent the uplink signal 202 or the radar transmit signal 208 of FIG. 2.

As shown via the transmit path, the RF signal 620-1 is derived from the IF signal 618-1, which in turn is derived from the analog baseband signal 616-1 and the digital baseband signal 614-1.

Along the receive path, which is shown via the receiver 604, the RF circuit 610 receives another radio-frequency signal 620-2 (RF signal 620-2). The RF signal 620-2 may represent the downlink signal 204 or the radar receive signal 210, which is reflected by the object 206 (FIG. 2). The RF circuit 610 downconverts the RF signal 620-2 to generate an intermediate-frequency signal 618-2 (IF signal 618-2). The IF circuit 608 downconverts the IF signal 618-2 to generate the analog baseband signal 616-2. The digital circuit 606 digitizes the analog baseband signal 616-2 to generate the digital baseband signal 614-2. As shown via the receive path, the digital baseband signal 614-2 is derived from the analog baseband signal 616-2, which in turn is derived from the IF signal 618-2 and the RF signal 620-2.

The processor 124 analyzes the digital baseband signal 614-2 to detect the object 206 and determine the range to the object 206. The digital baseband signal 614-2 can contain the respective beat frequencies 422-1 and 422-2 associated with the radar receive signal 210-1 and the radar transmit signal 208-3 of FIGS. 4-3 and 5. As shown via the multiple upconversion and downconversion stages of the wireless transceiver 120, the wireless transceiver 120 implements a superheterodyne transceiver. Alternatively, the wireless transceiver 120 may be implemented as a direct conversion transceiver.

The pseudorandom offset generator 122 can be implemented at any frequency stage, such as within the digital circuit 606 (e.g., a baseband-frequency stage), the IF circuit 608 (e.g., an intermediate-frequency stage), or the RF circuit 610 (e.g., a radio-frequency stage). The pseudorandom offset generator 122 generates the pseudorandom offset 216, which can comprise the frequency offset 218-1 or the time offset 220-1. The wireless transceiver 120 uses the pseudorandom offset 216 to transmit the radar transmit signal 208-1 and to receive the radar receive signal 210-1, as further described with respect to FIGS. 7 to 10.

Although not explicitly shown along the receive path, the RF circuit 610, the IF circuit 608, the digital circuit 606, or the processor 124 can include a filter or logic that discards frequencies that are greater than the frequency FR 506. In this manner, the beat frequency 422-2 can be discarded and not used to determine if an object 206 is detected. As such, the computing device 102 can appropriately adjust the transmission parameter 312 based on radar receive signals 210 and avoid adjusting the transmission parameter 312 based on radar transmit signals that are received from other computing devices.

Figure 7:
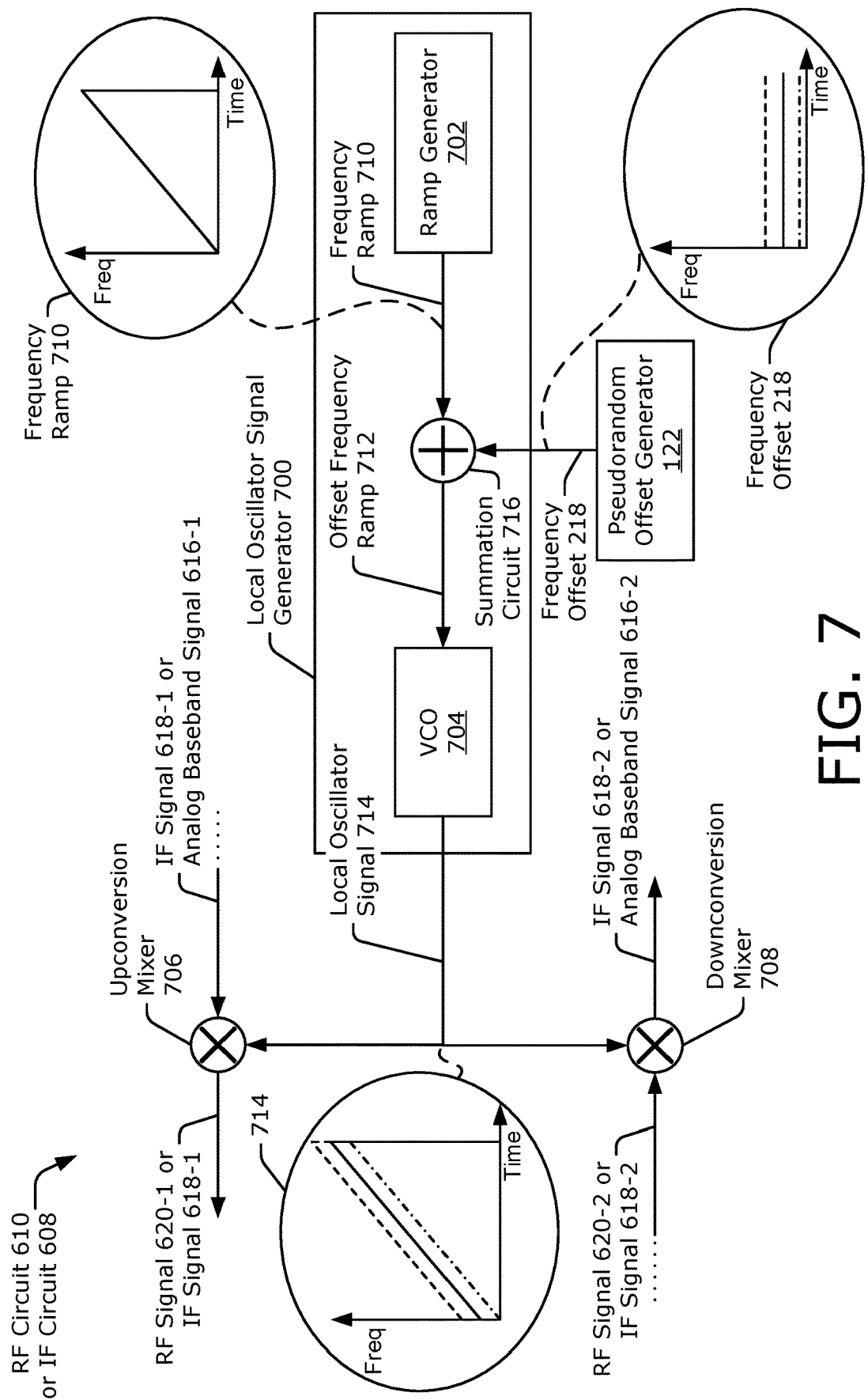
FIG. 7 illustrates an example radio-frequency circuit or intermediate-frequency circuit for radar interference mitigation using a frequency offset.

FIG. 7 illustrates an example RF circuit 610 or IF circuit 608 for radar interference mitigation using a frequency offset 218. The RF circuit 610 or the IF circuit 608 is shown to include the pseudorandom offset generator 122 and a local oscillator signal generator 700. The local oscillator signal generator 700 is coupled to the pseudorandom offset generator 122, and includes a ramp generator 702, a summation circuit 716, and a voltage controlled oscillator 704. The RF circuit 610 or the IF circuit 608 also includes an upconversion mixer 706 and a downconversion mixer 708, which are coupled to the local oscillator signal generator 700.

The ramp generator 702 generates a frequency ramp 710, which has a slope K based on a predetermined modulation type. The pseudorandom offset generator 122 generates the frequency offset 218, which is used to shift the frequency ramp 710 up or down (e.g., increase or decrease the frequencies specified by the frequency ramp 710). Three example frequency offsets 218 are shown at the bottom left of FIG. 7 with different line styles. In general, the frequency offset 218 is a pseudorandom number that remains unchanged during a duration of the frequency ramp 710.

The summation circuit 716 generates an offset frequency ramp 712 based on the frequency ramp 710 and the frequency offset 218. As an example, the frequency ramp 710 and the frequency offset 218 can be represented as direct current (DC) voltages, which are added together via the summation circuit 716 to produce the offset frequency ramp 712. The voltage controlled oscillator 704 generates a local oscillator signal 714 having a frequency that varies according to the offset frequency ramp 712. A center frequency of the local oscillator signal 714 is dependent upon which frequency offset 218 is provided via the pseudorandom offset generator 122. Different example local oscillator signals 714 corresponding to the example frequency offsets 218 are shown on the left side of FIG. 7.

The local oscillator signal 714 is provided to the upconversion mixer 706 as a reference signal. Using the local oscillator signal 714, the upconversion mixer 706 performs an upconversion operation that modulates and upconverts the IF signal 618-1 or the analog baseband signal 616-1 to produce the RF signal 620-1 or the IF signal 618-1, respectively. The local oscillator signal 714 is also provided to the downconversion mixer 708 as a reference signal. Using the local oscillator signal 714, the downconversion mixer 708 performs a downconversion operation that demodulates and downconverts the RF signal 620-2 or the IF signal 618-2 to the IF signal 618-2 or the analog baseband signal 616-2, respectively. Because the frequency offset 218 is incorporated within the local oscillator signal 714, the frequency offset 218 is used to generate the radar transmit signal 208 and is effectively removed (e.g., compensated for) during reception of the radar receive signal 210. By applying the frequency offset 218 to the local oscillator signal 714, the range to the object 206 can be accurately determined based on the radar receive signal 210 and the radar transmit signal 208-3 can be filtered from the radar receive signal 210

In the depicted configuration, the frequency offset 218 is applied to the transmit and receive chains in an analog domain. Furthermore, the frequency offset 218 and the modulation are performed together in a frequency stage. Another example implementation in which the frequency offset 218 and the modulation are performed at different frequency stages are shown in FIG. 8.

Figure 8:
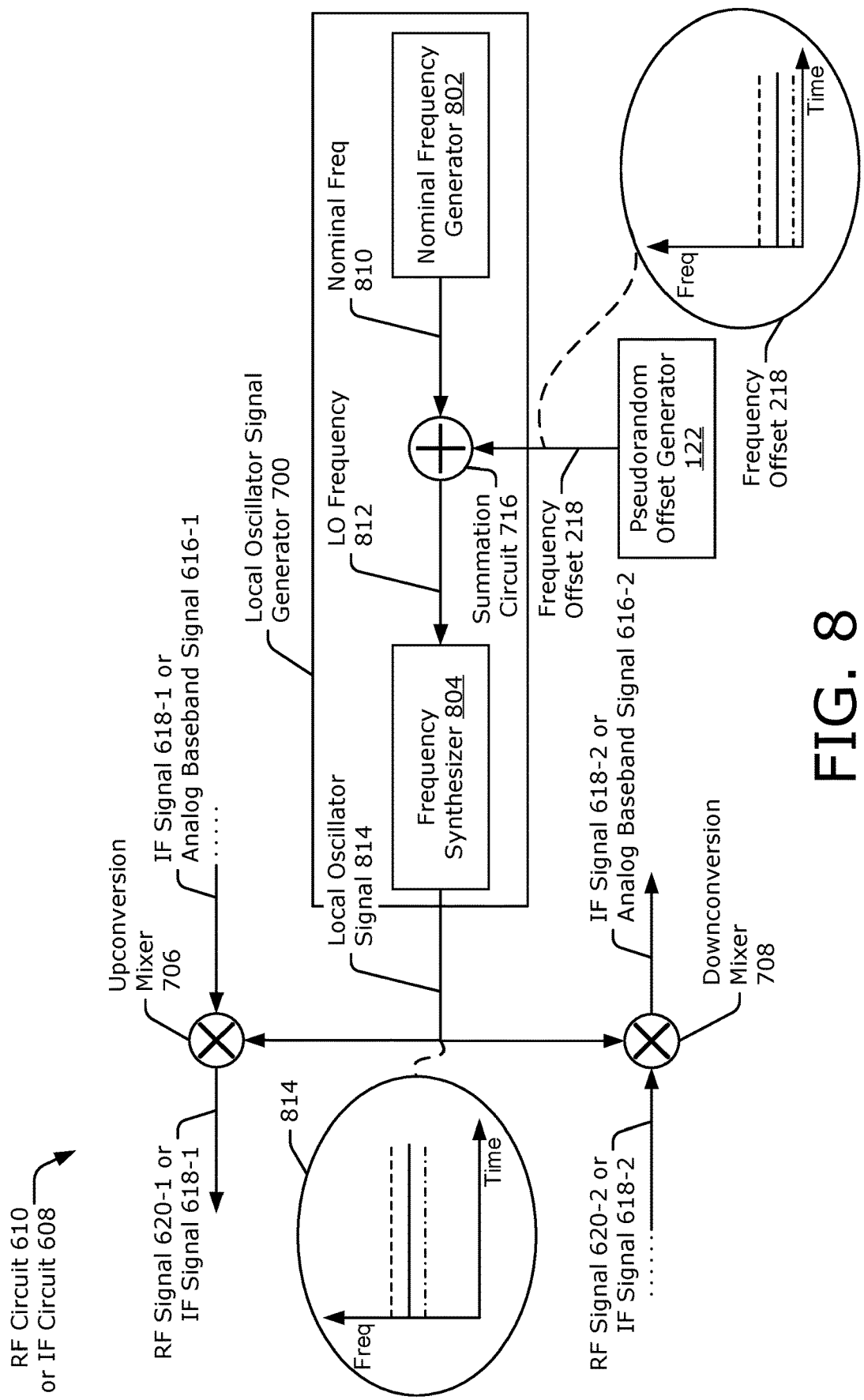
FIG. 8 illustrates another example radio-frequency circuit or intermediate-frequency circuit for radar interference mitigation using a frequency offset.

FIG. 8 illustrates another example RF circuit 610 or IF circuit 608 for radar interference mitigation using a frequency offset 218. In FIG. 8, the modulation and demodulation operations are performed in another frequency stage and are not shown. The RF circuit 610 or the IF circuit 608 is shown to include the pseudorandom offset generator 122 and the local oscillator signal generator 700. In this example, the local oscillator signal generator 700 includes a nominal frequency generator 802, a frequency synthesizer 804, and the summation circuit 716. The RF circuit 610 or the IF circuit 608 also include the upconversion mixer 706 and the downconversion mixer 708.

The nominal frequency generator 802 generates (e.g., selects) a nominal frequency 810 (e.g., a carrier frequency), which is added to the frequency offset 218 to produce a local oscillator frequency 812. The frequency synthesizer 804 generates a local oscillator signal 814 having the local oscillator frequency 812. In general, the frequency of the local oscillator signal 814 remains relatively constant based on the local oscillator frequency 812 and is not modulated like the local oscillator signal 714 of FIG. 7. Three examples of the local oscillator signal 814 are shown on the left of FIG. 8 with different lines styles.

In FIG. 8, the local oscillator signal 814 is provided to the upconversion mixer 706 as a reference signal that upconverts the IF signal 618-1 or the analog baseband signal 616-1 to produce the RF signal 620-1 or the IF signal 618-1, respectively. The local oscillator signal 814 is also provided to the downconversion mixer 708 as a reference signal that downconverts the RF signal 620-2 or the IF signal 618-2 to the IF signal 618-2 or the analog baseband signal 616-2, respectively. In this way, the radar transmit signal 208 is offset in frequency, and the frequency offset 218 is compensated for while receiving the radar receive signal 210. In contrast with the application of the frequency offset 218 in the analog domain, as shown FIGS. 7 and 8, an example digital domain application is further described with respect to FIG. 9.

Figure 9:
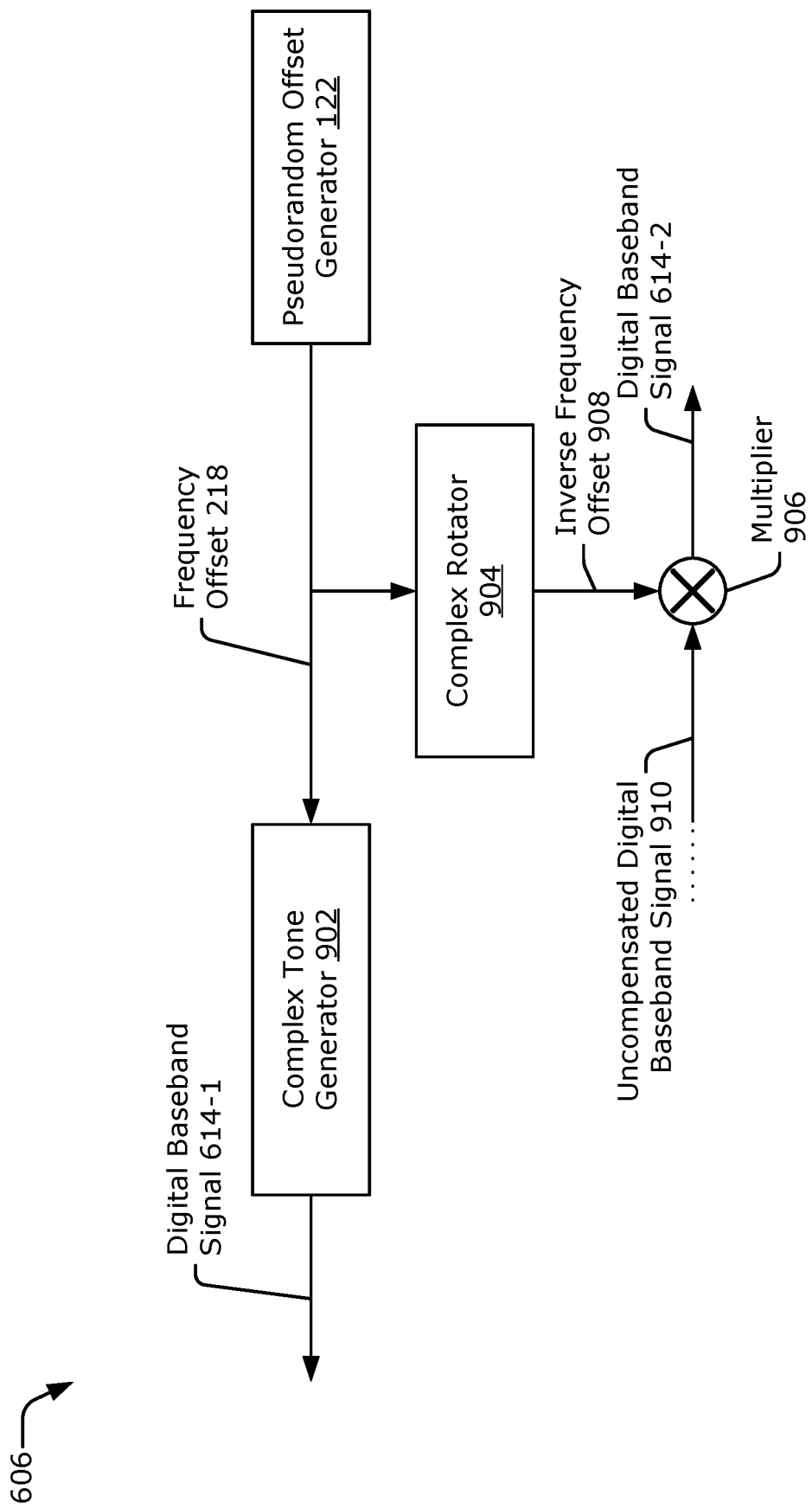
FIG. 9 illustrates an example digital circuit for radar interference mitigation using a frequency offset.

FIG. 9 illustrates an example digital circuit 606 for radar interference mitigation using a frequency offset 218. In the depicted configuration, the digital circuit 606 includes the pseudorandom offset generator 122, a complex tone generator 902, a complex rotator 904, and a multiplier 906. The complex tone generator 902 generates the digital baseband signal 614-1 having a frequency (e.g., a tone) that includes the frequency offset 218. The complex rotator 904 generates an inverse frequency offset 908. The multiplier 906 performs a multiplication operation that combines an uncompensated digital baseband signal 910, which is derived from the analog baseband signal 616-2 of FIG. 6, with the inverse frequency offset 908 to produce the digital baseband signal 614-2. Through this combination, the inverse frequency offset 908 effectively cancels (e.g., removes, or compensates for) the frequency offset 218 that is used to generate the digital baseband signal 614-1. The inverse frequency offset 908 also enables the radar transmit signal 208-3 to be filtered from the radar receive signal 210. Accordingly, the range to the object 206 can be determined based on the digital baseband signal 614-2.

Figure 10:
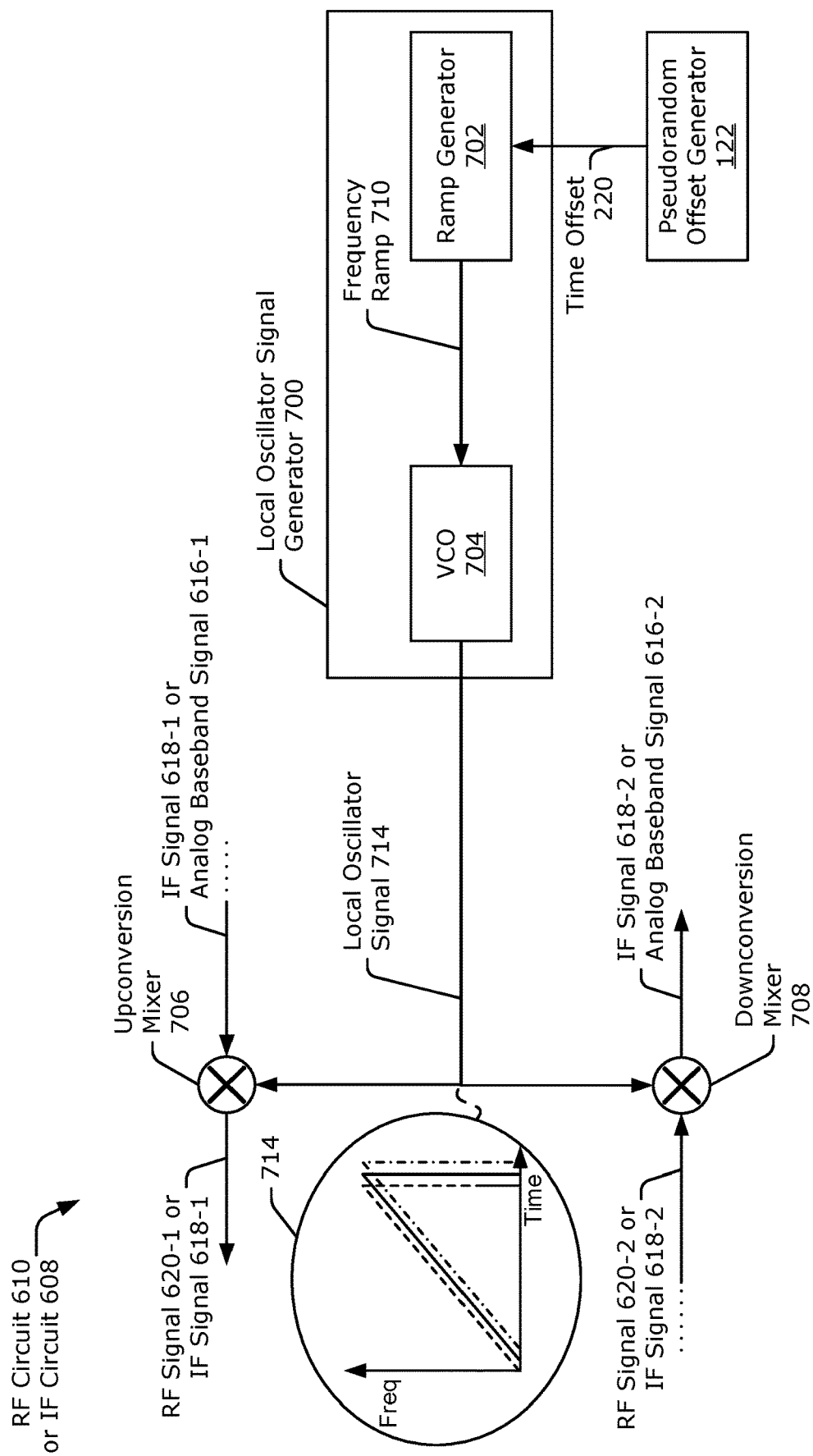
FIG. 10 illustrates an example radio-frequency circuit or intermediate-frequency circuit for radar interference mitigation using a time offset.

FIG. 10 illustrates an example radio-frequency circuit 610 or intermediate-frequency circuit 608 for radar interference mitigation using a time offset 220. In the depicted configuration, the RF circuit 610 or the IF circuit 608 includes the local oscillator signal generator 700, the pseudorandom offset generator 122, the upconversion mixer 706, and the downconversion mixer 708. The local oscillator signal generator 700 includes the ramp generator 702 and the voltage controlled oscillator 704. In this case, the ramp generator 702 generates the frequency ramp 710 based on the time offset 220. In other words, generation of the frequency ramp 710 is delayed according to the time offset 220. This in turn delays transmission of the radar transmit signal 208 according to the time offset 220. Example local oscillator signals 714 that are generated according to different time offsets 220 are shown on the left side of FIG. 10 with different line styles. In this case, the modulation and demodulation operations are performed via use of the local oscillator signal 714 for upconversion or downconversion, respectively.

In the depicted configuration, the time offset 220 is applied to the transmit and receive chains in an analog domain. Furthermore, the time offset 220 and the modulation and demodulation operations are performed together in a frequency stage. In other implementations, the modulation and demodulation operations are performed in another frequency stage not shown (e.g., similar to FIG. 8). In other examples, the time offset 220 can be applied to generation of the digital baseband signal 614-1 (of FIG. 6 or 9).

Other implementations may employ the pseudorandom offset generator 122 to generate both the frequency offset 218 and the time offset 220. Other types of pseudorandom offsets 216 are also possible. For example, the pseudorandom offset 216 can be used to determine a code that is applied to the radar transmit signal 208 for code-division multiple access (CDMA). The described techniques can also be used to mitigate interference between multiple antennas 126-1 to 126-N of the computing device 102. In this manner, the computing device 102 can transmit multiple radar transmit signals 208 during a same time period via different antennas 126-1 to 126-N.

Figure 11:
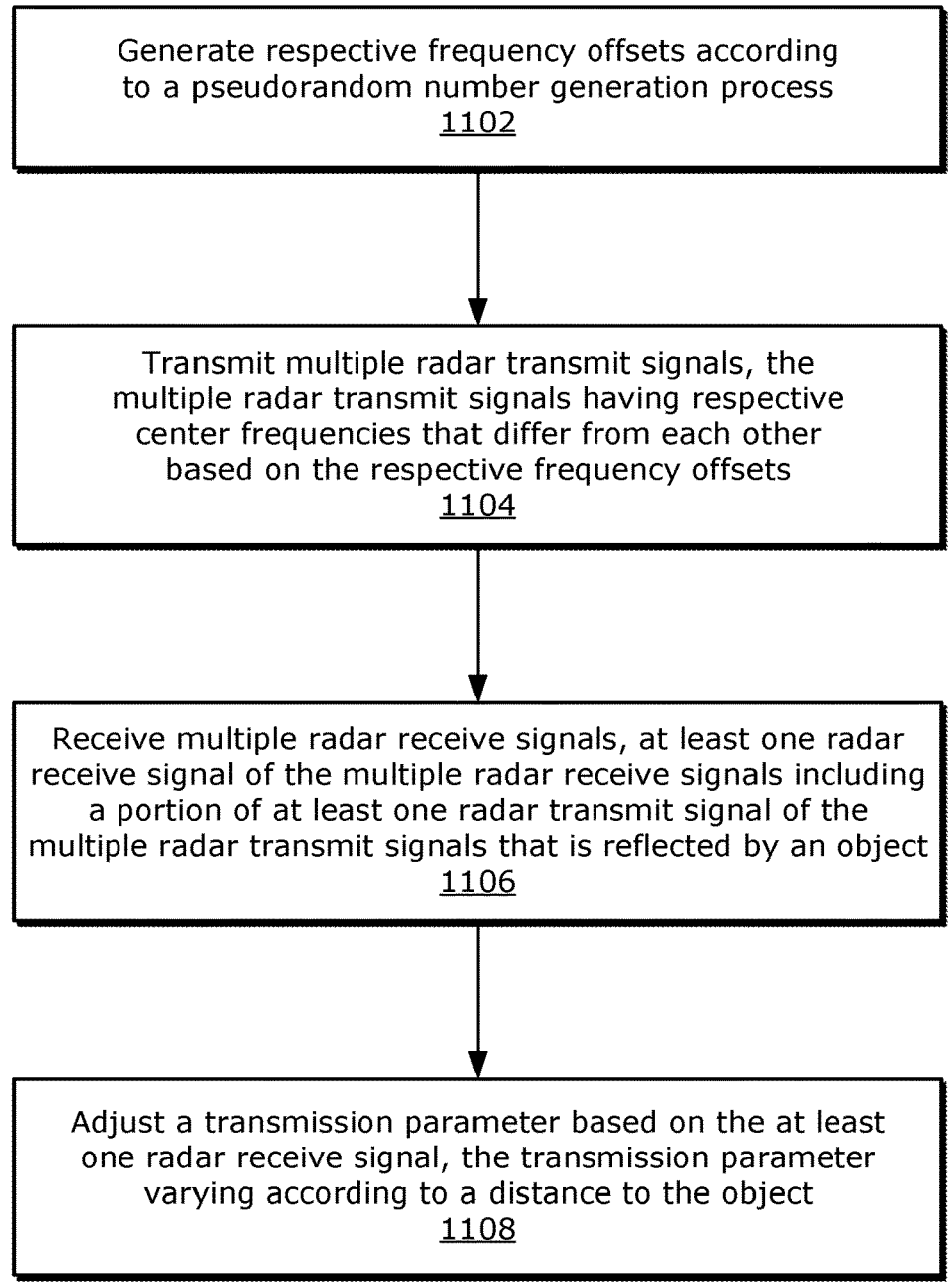
FIG. 11 is a flow diagram illustrating an example process for radar interference mitigation using a pseudorandom offset.

FIG. 11 is a flow diagram illustrating an example process 1100 for radar interference mitigation using a pseudorandom offset. The process 1100 is described in the form of a set of blocks 1102-1108 that specify operations that can be performed. However, operations are not necessarily limited to the order shown in FIG. 11 or described herein, for the operations may be implemented in alternative orders or in fully or partially overlapping manners. Also, fewer, more, and/or different operations may be implemented to perform the process 1100, or an alternative process. Operations represented by the illustrated blocks of the process 1100 may be performed by the computing device 102 (e.g., of FIG. 1 or 2). More specifically, the operations of the process 1100 may be performed by the pseudorandom offset generator 122 or the wireless transceiver 120, as shown in FIG. 1.

At block 1102, respective frequency offsets are generated according to a pseudorandom number generation process. For example, the pseudorandom offset generator 122 can generate the frequency offset 218 according to a pseudorandom number generation process, as shown in FIGS. 7-9. In other implementations, the pseudorandom offset generator 122 can generate the time offset 220 in addition or in the alternative to generating the frequency offset 218. Generally, the frequency offset 218 is determined based on a pseudorandom number that exists within a sequence of pseudorandom numbers. The sequence of pseudorandom numbers can be generated by the pseudorandom number generator 122 based on a seed.

At block 1104, multiple radar transmit signals are transmitted. The multiple radar transmit signals have respective center frequencies that differ from each other based on the respective frequency offsets. For example, the wireless transceiver 120 and at least one of the antennas 126-1 to 126-N can generate the multiple radar transmit signals 208-1 and 208-2 of FIG. 3. The multiple radar transmit signals 208-1 and 208-2 can have respective center frequencies that differ from each other based on the frequency offsets 218-1 and 218-2.

At block 1106, multiple radar receive signals are received. At least one radar receive signal of the multiple radar receive signals includes a portion of at least one radar transmit signal of the multiple radar transmit signals that is reflected by an object. For example, the wireless transceiver 120 and at least one of the antennas 126-1 to 126-N can receive the radar receive signals 210 associated with the multiple radar transmit signals 208. As shown in FIGS. 4-1, the example radar receive signal 210-1 includes at least a portion of the radar transmit signal 208-1 that is reflected by the object 206.

At block 1108, a transmission parameter is adjusted based on the at least one radar receive signal. The transmission parameter varies according to a distance to the object. For example, the processor 124 or the wireless transceiver 120 can adjust the transmission parameter 312, which can comprise a transmission power level, a beam steering angle, a transmission frequency, a selected antenna or antenna array, a communication protocol, and so forth. The wireless transceiver 120 may adjust the transmission parameter 312 for a next uplink signal 202 to account for MPE compliance guidelines or to achieve a target power density at the object 206. Using the radar transmit signal 208 and the reflected radar receive signal 210, the wireless transceiver 120 can determine the distance to the object 206 and appropriately adjust the transmission parameter 312. Use of the frequency offset 218 also enables the computing device 102 to discard or ignore false detections caused by radar transmit signals that are transmitted from other computing devices.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
an antenna array;
a pseudorandom offset generator configured to generate at least one pseudorandom offset; and
a wireless transceiver coupled to the antenna array and the pseudorandom offset generator, the wireless transceiver configured to:
transmit, via the antenna array, a radar transmit signal based on the at least one pseudorandom offset;
receive, via the antenna array, at least a portion of another radar transmit signal from another apparatus;
receive, via the antenna array, a radar receive signal that includes a portion of the radar transmit signal that is reflected by an object, a frequency of the radar receive signal being different than another frequency of the other radar transmit signal at a given time based on the at least one pseudorandom offset; and
communicate with another apparatus to determine a seed that differs from another seed used by the other apparatus,
wherein the pseudorandom offset generator is configured to perform a pseudorandom number generation process using the determined seed to generate the at least one pseudorandom offset.

2. The apparatus of claim 1, wherein:
the pseudorandom offset generator is configured to generate a frequency offset as the at least one pseudorandom offset, and
the wireless transceiver is configured to transmit the radar transmit signal with a center frequency based on the frequency offset.

3. The apparatus of claim 1, wherein:
the pseudorandom offset generator is configured to generate a time offset as the at least one pseudorandom offset, and
the wireless transceiver is configured to transmit the radar transmit signal during a time period that is based on the time offset.

4. The apparatus of claim 1, wherein:
the pseudorandom offset generator is configured to generate both a frequency offset and a time offset as the at least one pseudorandom offset, and
the wireless transceiver is configured to:
transmit the radar transmit signal with a center frequency based on the frequency offset; and
transmit the radar transmit signal during a time period that is based on the time offset.

5. The apparatus of claim 1, wherein:
the pseudorandom offset generator is configured to generate at least one other pseudorandom offset, the at least one other pseudorandom offset being different from the at least one pseudorandom offset, and
the wireless transceiver is configured to transmit another radar transmit signal based on the at least one other pseudorandom offset.

6. The apparatus of claim 1, wherein the wireless transceiver is configured to:
adjust a transmission parameter based on the radar receive signal instead of the other radar transmit signal to produce an adjusted transmission parameter, the transmission parameter varying according to a distance to the object; and
transmit an uplink signal using the adjusted transmission parameter, the uplink signal transmitted via the antenna array.

7. An apparatus comprising:
an antenna array; and
a wireless transceiver coupled to the antenna array, the wireless transceiver configured to:
transmit multiple radar transmit signals via the antenna array, the multiple radar transmit signals having respective center frequencies that differ from each other based on respective frequency offsets;
receive multiple radar receive signals via the antenna array, at least one radar receive signal of the multiple radar receive signals including a portion of at least one radar transmit signal of the multiple radar transmit signals that is reflected by an object;
receive, along with the at least one radar receive signal, another radar transmit signal from another apparatus;
compensate for at least one frequency offset of the respective frequency offsets that is associated with the at least one radar receive signal such that a beat frequency associated with the at least one radar receive signal is substantially different from a beat frequency associated with the other radar transmit signal; and
adjust a transmission parameter based on the at least one radar receive signal, the transmission parameter varying according to a distance to the object.

8. The apparatus of claim 7, further comprising a pseudorandom offset generator, the pseudorandom offset generator configured to generate the respective frequency offsets, the respective frequency offsets comprising pseudorandom numbers.

9. The apparatus of claim 8, wherein the wireless transceiver includes a local oscillator signal generator coupled to the pseudorandom offset generator, the local oscillator signal generator configured to generate multiple local oscillator signals based on the respective frequency offsets.

10. The apparatus of claim 9, wherein the wireless transceiver includes:

an upconversion mixer coupled to the local oscillator signal generator, the upconversion mixer configured to perform upconversion operations based on the multiple local oscillator signals to transmit the multiple radar transmit signals; and a downconversion mixer coupled to the local oscillator signal generator, the downconversion mixer configured to perform downconversion operations based on the multiple local oscillator signals to receive the multiple radar receive signals.

11. The apparatus of claim 10, wherein the local oscillator signal generator includes:
    a ramp generator configured to generate respective frequency ramps;
    a summation circuit coupled to the ramp generator and the pseudorandom offset generator, the summation circuit configured to generate respective offset frequency ramps based on the respective frequency ramps and the respective frequency offsets; and
    a voltage controlled oscillator coupled to the summation circuit, the upconversion mixer, and the downconversion mixer; the voltage controlled oscillator configured to generate the multiple local oscillator signals based on the respective offset frequency ramps; the multiple local oscillator signals having respective modulation frequencies that differ from each other based on the respective frequency offsets.

12. The apparatus of claim 10, wherein the local oscillator signal generator includes:
    a nominal frequency generator configured to generate respective nominal frequencies;
    a summation circuit coupled to the nominal frequency selector and the pseudorandom offset generator, the summation circuit configured to generate multiple local oscillator frequencies based on the respective nominal frequencies and the respective frequency offsets; and
    a frequency synthesizer coupled to the summation circuit, the upconversion mixer, and the downconversion mixer; the frequency synthesizer configured to generate the multiple local oscillator signals based on the multiple local oscillator frequencies, the multiple local oscillator signals having approximately constant frequencies that differ from each other based on the respective frequency offsets.

13. The apparatus of claim 10, wherein the upconversion mixer and the downconversion mixer are configured to respectively perform the upconversion operations and the downconversion operations at a radio-frequency stage or an intermediate-frequency stage of the wireless transceiver.

14. The apparatus of claim 8, wherein:
    the wireless transceiver includes a complex tone generator coupled to the pseudorandom offset generator, the complex tone generator configured to:
        generate multiple complex tones based on the respective frequency offsets; and
        generate multiple digital baseband signals based on multiple complex tones; and
    the wireless transceiver is configured to generate the multiple radar transmit signals based on the multiple digital baseband signals.

15. The apparatus of claim 14, wherein:
    the wireless transceiver is configured to generate uncompensated digital baseband signals based on the multiple radar receive signals; and
    the wireless transceiver includes:
        a complex rotator coupled to the pseudorandom offset generator, the complex rotator configured to generate respective inverse frequency offsets based on the respective frequency offsets; and
        a multiplier coupled to the complex rotator, the multiplier configured to generate, based on the respective inverse frequency offsets, other multiple digital baseband signals from the uncompensated digital baseband signals.

16. The apparatus of claim 8, wherein:
    the wireless transceiver is configured to communicate with another apparatus to determine a seed that differs from another seed used by the other apparatus; and
    the pseudorandom offset generator is configured to perform a pseudorandom number generation process using the seed to generate the respective frequency offsets.

17. The apparatus of claim 7, wherein the transmission parameter comprises at least one of the following:
    a transmission power level;
    a beam steering angle;
    a transmission frequency;
    a selected antenna array; or
    a communication protocol.

18. The apparatus of claim 7, wherein the beat frequency associated with the other radar transmit signal is greater than 0.5 megahertz.

19. The apparatus of claim 7, wherein the wireless transceiver is configured to transmit the multiple radar transmit signals during different time periods.

20. The apparatus of claim 19, wherein:
    the multiple radar transmit signals comprise a first radar transmit signal transmitted during a first time period and a second radar transmit signal transmitted during a second time period; and
    the wireless transceiver is configured to transmit, via the antenna array, an uplink signal during a third time period that is between the first time period and the second time period using an adjusted transmission parameter.

21. The apparatus of claim 7, wherein the multiple radar transmit signals comprise multiple frequency-modulated continuous-wave signals.

22. An apparatus comprising:
    offset generation means for generating respective frequency offsets according to a pseudorandom number generation process;
    an antenna array; and
    a wireless transceiver coupled to the antenna array and the offset generation means, the wireless transceiver comprising a complex tone generator coupled to the offset generator means, the complex tone generator configured to:
        generate multiple complex tones based on the respective frequency offsets; and
        generate multiple digital baseband signals based on the multiple complex tones, wherein the wireless transceiver is configured to:
        generate multiple radar transmit signals from the multiple digital baseband signals;
        transmit the multiple radar transmit signals via the antenna array, the multiple radar transmit signals having respective center frequencies that differ from each other based on the respective frequency offsets;
        receive multiple radar receive signals via the antenna array, at least one radar receive signal of the multiple radar receive signals including a portion of at least one radar transmit signal of the multiple radar transmit signals that is reflected by an object; and adjust a transmission parameter based on the at least one radar receive signal, the transmission parameter varying according to a distance to the object.

23. The apparatus of claim 22, wherein the wireless transceiver includes:
a local oscillator signal generator coupled to the offset generation means, the local oscillator signal generator configured to generate multiple local oscillator signals having respective frequencies based on the respective frequency offsets;
an upconversion mixer coupled to the local oscillator signal generator, the upconversion mixer configured to perform upconversion operations based on the multiple local oscillator signals to transmit the multiple radar transmit signals; and
a downconversion mixer coupled to the local oscillator signal generator, the downconversion mixer configured to perform downconversion operations based on the multiple local oscillator signals to receive the multiple radar receive signals.

24. The apparatus of claim 23, wherein the local oscillator signal generator is configured to:
generate the multiple local oscillator signals such that the multiple local oscillator signals have respective modulation frequencies that differ from each other based on the respective frequency offsets; or
generate the multiple local oscillator signals such that the multiple local oscillator signals have respective constant frequencies that differ from each other based on the respective frequency offsets.

25. A method comprising:
generating respective frequency offsets according to a pseudorandom number generation process;
generating digital baseband signals having respective frequencies based on the respective frequency offsets;
transmitting multiple radar transmit signals, the multiple radar transmit signals having respective center frequencies that differ from each other based on the respective frequency offsets;
receiving multiple radar receive signals, at least one radar receive signal of the multiple radar receive signals including a portion of at least one radar transmit signal of the multiple radar transmit signals that is reflected by an object;
generating respective inverse frequency offsets based on the respective frequency offsets;
generating uncompensated digital baseband signals based on the multiple radar receive signals;
generating other digital baseband signals by respectively multiplying the uncompensated digital baseband signals with the respective inverse frequency offsets; and
adjusting a transmission parameter based on the at least one radar receive signal, the transmission parameter varying according to a distance to the object.

26. The method of claim 25, further comprising:
generating multiple local oscillator signals based on the respective frequency offsets, wherein:
the transmitting of the multiple radar transmit signals comprises performing upconversion operations based on the multiple local oscillator signals; and
the receiving of the multiple radar receive signals comprises performing downconversion operations based on the multiple local oscillator signals.

27. The method of claim 26, wherein the generating of the multiple local oscillator signals comprises:
generating the multiple local oscillator signals such that the multiple local oscillator signals have respective modulation frequencies that differ from each other based on the respective frequency offsets; or
generating the multiple local oscillator signals such that the multiple local oscillator signals have respective constant frequencies that differ from each other based on the respective frequency offsets.

* * * * *